US012659031B2

(12) United States Patent
Lee et al.

(10) Patent No.: US 12,659,031 B2
(45) Date of Patent: Jun. 16, 2026

(54) INHOMOGENEOUS POLARIZATION-BASED COHERENT TRANSCEIVER FOR BEAM ALIGNMENT AND METHOD THEREFOR

(71) Applicant: LG Electronics Inc., Seoul (KR)

(72) Inventors: Hojae Lee, Seoul (KR); Sangrim Lee, Seoul (KR); Kijun Jeon, Seoul (KR); JaYeong Kim, Seoul (KR); Byungkyu Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 18/695,712

(22) PCT Filed: Oct. 4, 2022

(86) PCT No.: PCT/KR2022/014878
§ 371 (c)(1),
(2) Date: Mar. 26, 2024

(87) PCT Pub. No.: WO2023/059021
PCT Pub. Date: Apr. 13, 2023

(65) Prior Publication Data
US 2025/0015890 A1      Jan. 9, 2025

(30) Foreign Application Priority Data

Oct. 6, 2021    (KR) ........................ 10-2021-0132397

(51) Int. Cl.
*G02B 27/28* (2006.01)
*G03B 21/20* (2006.01)
*H04B 10/112* (2013.01)

(52) U.S. Cl.
CPC ......... *H04B 10/112* (2013.01); *G02B 27/283* (2013.01); *G02B 27/286* (2013.01); *G03B 21/2073* (2013.01)

(58) Field of Classification Search
CPC .. H04B 10/112; G02B 27/283; G02B 27/286; G03B 21/2073
See application file for complete search history.

(56) References Cited

U.S. PATENT DOCUMENTS 8,306,438 B2    11/2012  Deczky et al.
8,805,188 B2     8/2014  Kikuchi
(Continued)

FOREIGN PATENT DOCUMENTS

WO    WO 2017/191900      11/2017

OTHER PUBLICATIONS

Extended European Search Report in European Appln. No. 22878842. 8, mailed on Sep. 12, 2025, 10 pages.
(Continued)

*Primary Examiner* — Janice N Tieu
(74) *Attorney, Agent, or Firm* — Fish & Richardson P.C.

(57) ABSTRACT

A method and a device used in an optical wireless communication (OWC) system are provided. A transmitting terminal transmits a plurality of reference signals to a receiving terminal through each of a plurality of beams. Each of the plurality of beams may have an inhomogeneous polarization beam pattern. The receiving terminal measures signal strength and polarization with respect to the plurality of reference signals. When the receiving terminal transmits feedback information including the measured signal strength information and polarization information to the transmitting terminal, the transmitting terminal may select at least one beam among the plurality of beams on the basis of the feedback information. Alternatively, the receiving terminal may select at least one beam from among the plurality of beams, which corresponds to at least one inhomogeneous polarization beam pattern among a plurality of inhomoge-
(Continued)

Transmit a plurality of reference signals via each of plurality of beams to a receiving end — S1200

Receive, from the receiving end, feedback information comprising signal strength information and polarization information measured for each of the plurality of reference signals — S1210

Select at least one beam from among the plurality of beams based on the signal strength information and the polarization information — S1220

Communicate with the receiving end based on the selected at least one beam — S1230 neous polarization beam patterns, on the basis of the measured signal strength and polarization.

15 Claims, 26 Drawing Sheets

(56)                    References Cited

U.S. PATENT DOCUMENTS

| | | |
|---|---|---|
| 8,942,569 B2 | 1/2015 | Tanimura et al. |
| 11,081,796 B2 | 8/2021 | Ashrafi |
| 2016/0365900 A1 | 12/2016 | Kim et al. |
| 2017/0244467 A1 | 8/2017 | Cho et al. |
| 2018/0205436 A1 | 7/2018 | Gil et al. |
| 2019/0222346 A1 | 7/2019 | MacKinnon |
| 2019/0239233 A1* | 8/2019 | Ryu ..................... H04W 72/21 |
| 2020/0007197 A1* | 1/2020 | Kang ................... H04L 5/0048 |
| 2020/0287677 A1* | 9/2020 | Kakishima .......... H04W 72/046 |
| 2022/0110011 A1* | 4/2022 | Ma ........................ H04L 5/0048 |
| 2022/0174531 A1* | 6/2022 | Zhu ...................... H04L 5/0048 |

OTHER PUBLICATIONS

International Search Report and Written Opinion in International Appln. No. PCT/KR2022/014878, mailed on Jan. 10, 2023, 11 pages (with English translation).

* cited by examiner

Figure 2:
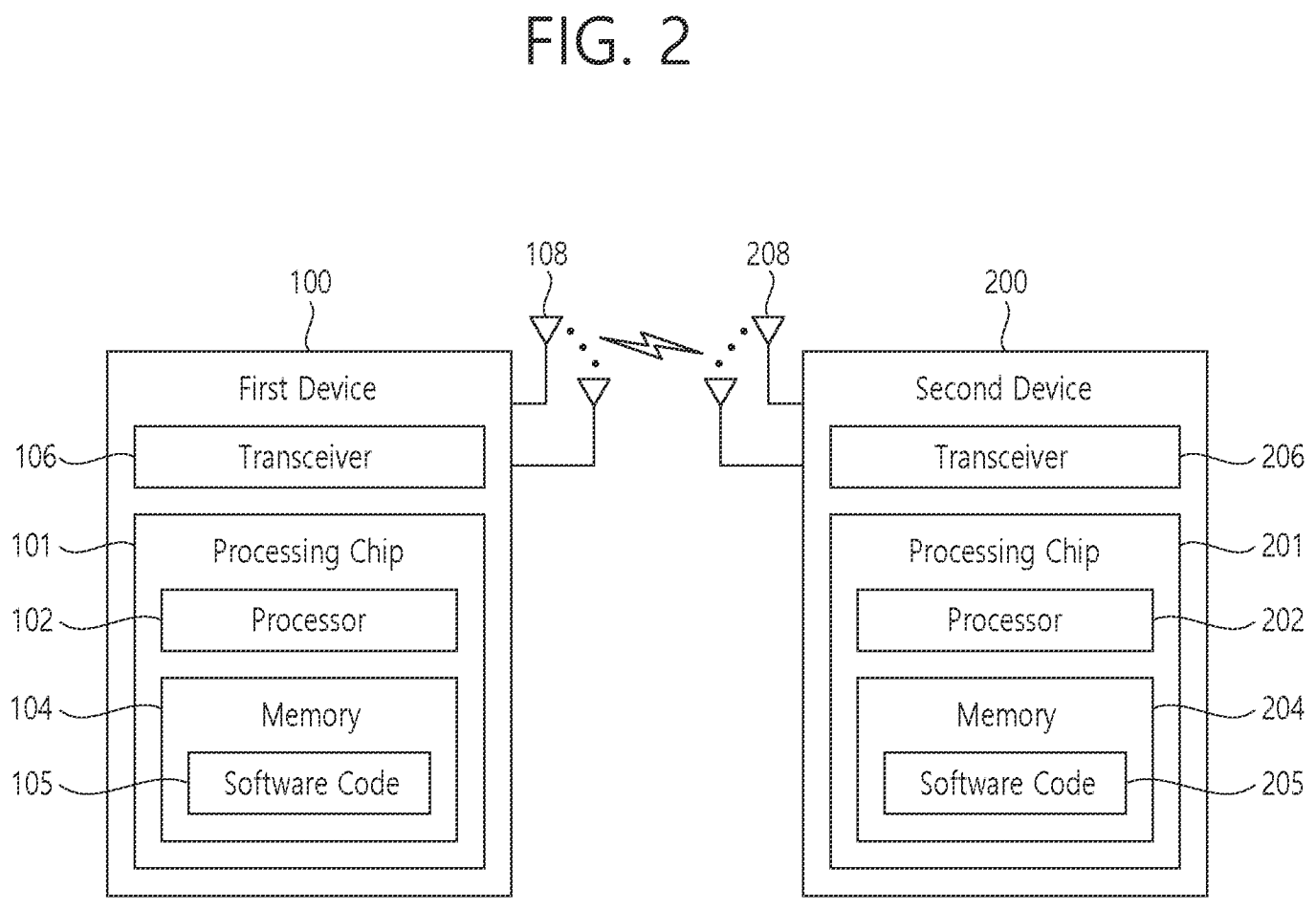

First Device 100

Transceiver 106

Processing Chip 101

Processor 102

Memory 104

Software Code 105

108

208

Second Device 200

Transceiver 206

Processing Chip 201

Processor 202

Memory 204

Software Code 205

FIG. 3

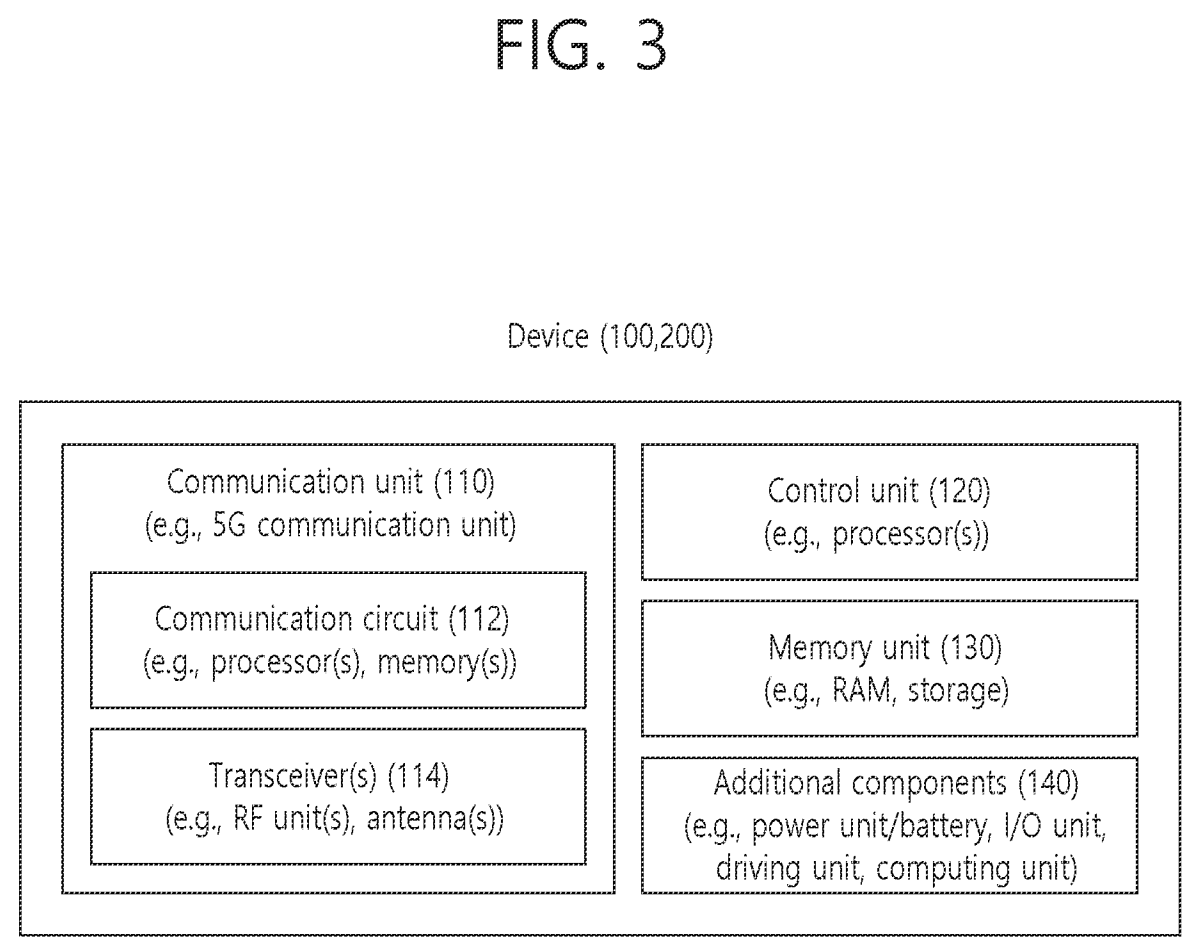

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

High Resolution Polarization pattern Matrix

| $P_{1,N}$ | $\vdots$ | $\vdots$ | $P_{1,2}$ | $P_{1,1}$ |
|-----------|----------|----------|-----------|-----------|
| $P_{2,N}$ | $\vdots$ | $\vdots$ | $P_{2,2}$ | $P_{2,1}$ |
| $\vdots$ | $\vdots$ | $P_{i,j}$ | $\vdots$ | $\vdots$ |
| $P_{N-1,N}$ | $\vdots$ | $\vdots$ | $\vdots$ | $\vdots$ |
| $P_{N,N}$ | $\vdots$ | $\vdots$ | $P_{N,2}$ | $P_{N,1}$ |

Inhomogeneous Polarization Pattern

3dB Coupler

Input 1 ——————————— (Input 1+Input 2)/2

Input 2 ——————————— (Input 1+Input 2)/2

Phase Difference=π

Power Source 1

Balanced PD

Optical Input 1 ————➤    I1

Optical Input 2 ————➤    I1

Electric Output

I1-I2

Amp

Power Source 2

INHOMOGENEOUS POLARIZATION-BASED COHERENT TRANSCEIVER FOR BEAM ALIGNMENT AND METHOD THEREFOR

CROSS-REFERENCE TO RELATED APPLICATIONS

This application is a National Stage application under 35 U.S.C. § 371 of International Application No. PCT/KR2022/014878, filed on Oct. 4, 2022, which claims the benefit of Korean Patent Application No. 10-2021-0132397, filed on Oct. 6, 2021. The disclosures of the prior applications are incorporated by reference in their entirety.

TECHNICAL FIELD

The present disclosure relates to a method and apparatus for use in Optical Wireless Communication (OWC) systems.

BACKGROUND

With the commercialization of New Radio (NR), the fifth generation (5G) mobile communications technology, research into sixth generation (6G) mobile communications technology is beginning. It is expected that 6th generation mobile communication technology will utilize frequency bands above 100 GHz. This is expected to increase the number of utilized frequencies by more than 10 times compared to 5G, and allow for greater utilization of spatial resources.

Electromagnetic waves in the radio frequency band have been widely used as a resource for wireless communication technology. To date, the vast amounts of wireless communication traffic required by advancing communication generations have been handled by increasing the available radio frequency bands or reducing the size of the cells covered by base stations. However, the development of wireless communication technology in the radio frequency band is becoming increasingly challenging due to the limitations of electronic devices as the frequency increases to tens of GHz and beyond, and the need for advanced beamforming technology due to the increasing straightness of the carrier.

SUMMARY

Optical Wireless Communication (OWC) may be a good alternative for organizing future mobile communication systems. OWC has the advantage of using ultra-wideband optical frequency resources, which are free from frequency allocation regulations, and of using fiber-based ultra-high speed communication system technologies that are already quite mature. The beamforming technology that is currently being actively researched and developed is also expected to be easy to apply, as it is not fundamentally different from the beam alignment technology used in mobile wireless optical communication systems.

In typical beam search, a single beam carries homogeneous information. Therefore, the relationship between the beam and the aperture determines the ability to distinguish between beams. The factors that distinguish beams may be physical resources such as time, frequency, and/or spatial. If the transmitting end uses a wide beam to perform beam search, the receiving end can detect one beam over a large area, but cannot fine-tune the receive aperture. On the other hand, if the transmitting end performs beam search using a narrow beam, the receiving end detects a single beam over a small area, which allows fine tuning to the receive aperture, but requires a large amount of physical resources as it should repeatedly search a large area over multiple times.

As a result, inhomogeneous information may be packed into a single beam, causing different information to be detected depending on the detection location. Accordingly, the receiving end may perform beam detection that would otherwise be performed by a plurality of beams at once.

Methods for effectively transmitting inhomogeneous beams and effectively detecting transmitted inhomogeneous beams, and/or structures of transmitters and receivers implementing the same, may be required.

In an aspect, a method performed by a transmitting end in a wireless communication system is provided. The method comprises transmitting a plurality of reference signals via each of plurality of beams to a receiving end, receiving, from the receiving end, feedback information comprising signal strength information and polarization information measured for each of the plurality of reference signals, selecting at least one beam from among the plurality of beams based on the signal strength information and the polarization information, and communicating with the receiving end based on the selected at least one beam.

In another aspect, a method performed by a receiving end in a wireless communication system is provided. The method comprises receiving a plurality of reference signals via each of a plurality of beams from a transmitting end, measuring a signal strength and a polarization for the plurality of reference signals, selecting, based on the measured signal strength and the polarization, at least one beam, from among the plurality of beams, corresponding to at least one inhomogeneous polarization beam pattern from among a plurality of inhomogeneous polarization beam patterns, and communicating with the transmitting end based on the selected at least one beam.

In another aspect, a transmitter and a receiver implementing the above methods are provided.

The present disclosure can have various advantageous effects.

For example, physical resources for beam search can be reduced.

For example, a transmitter can transmit an intensity signal and/or a demodulation signal via an inhomogeneous polarization beam, and a receiver can simultaneously acquire information about the signal and information about the polarization by the inhomogeneous polarization beam.

For example, it can be used in combination with a beam search procedure based on signal strength.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure are applied.

FIG. 2 shows an example of wireless devices to which implementations of the present disclosure are applied.

FIG. 3 shows an example of a wireless device to which implementations of the present disclosure are applied.

DETAILED DESCRIPTION

Figure 4:
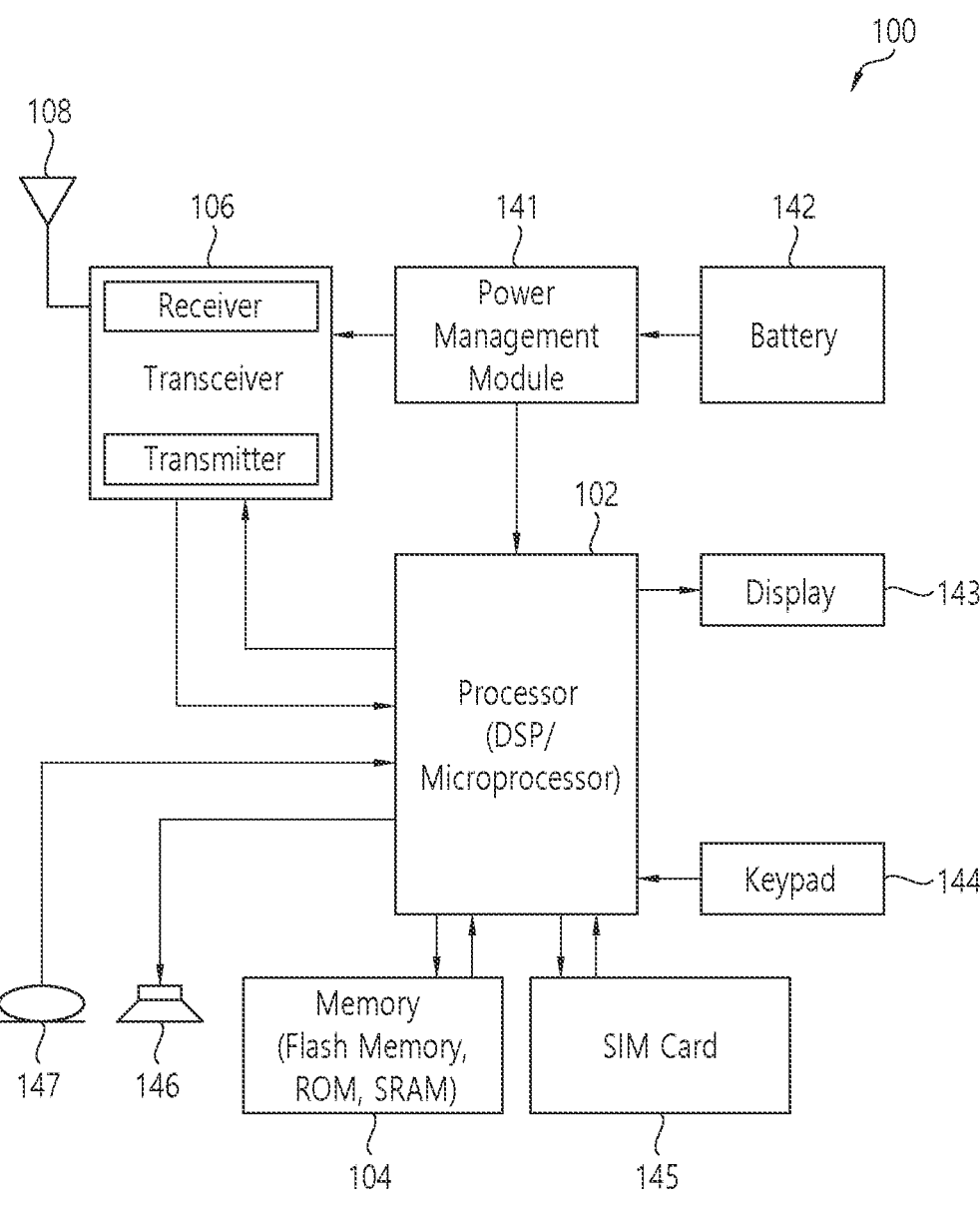
FIG. 4 shows an example of UE to which implementations of the present disclosure are applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
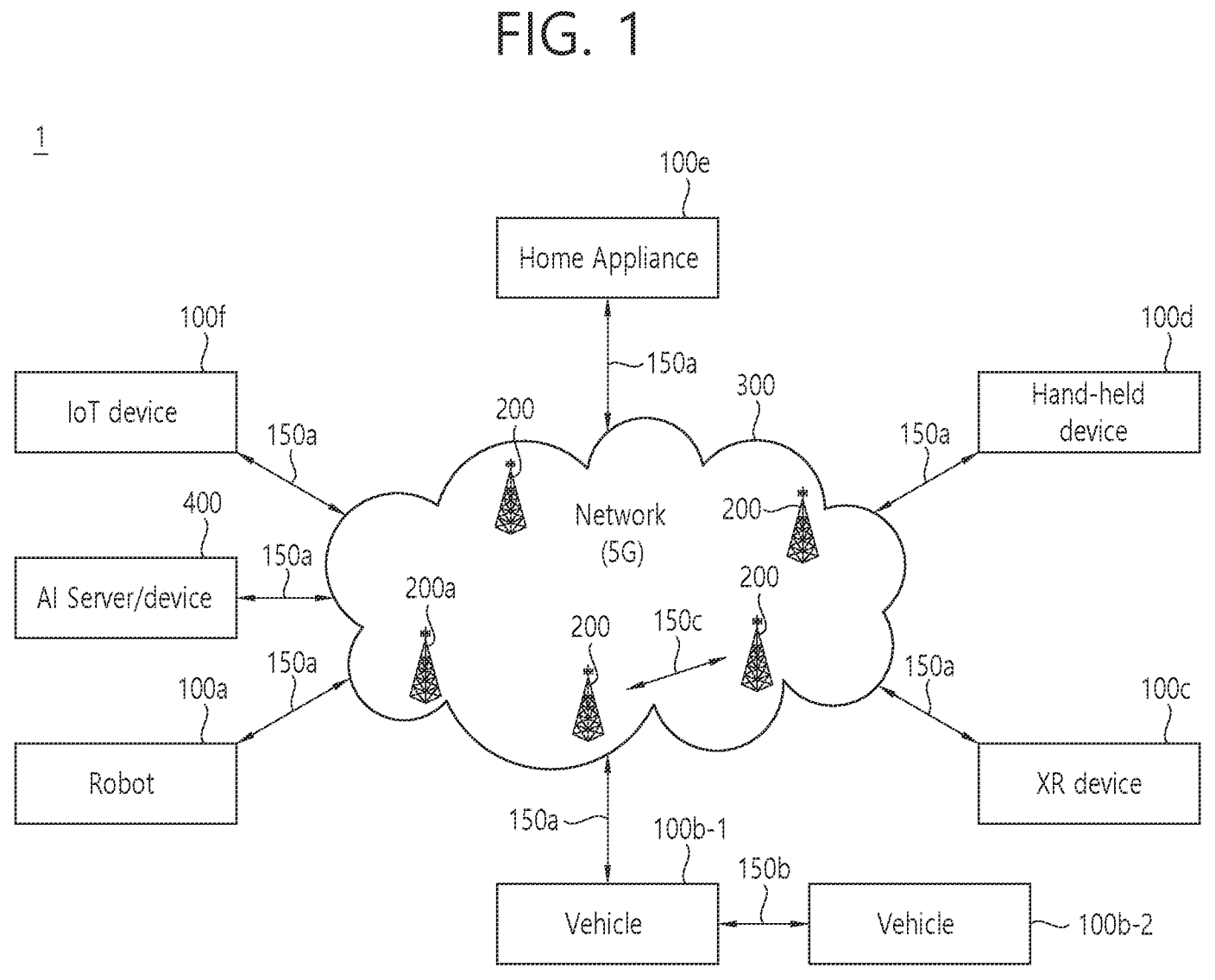

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100a to 100f, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using Radio Access Technology (RAT) (e.g., 5G NR or LTE) and may be referred to as communication/radio/5G devices. The wireless devices 100a to 100f may include, without being limited to, a robot 100a, vehicles 100b-1 and 100b-2, an eXtended Reality (XR) device 100c, a hand-held device 100d, a home appliance 100e, an Internet-of-Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-every thing (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, w % ben executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs) and/or one or more Service Data Units (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable ROMs (EEPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in UL and as a receiving device in DL. In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a Node B (NB), an eNode B (eNB), or a gNB.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, Input/Output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an Application Processor (AP), an Electronic Control Unit (ECU), a Central Processing Unit (CPU), a Graphical Processing Unit (GPU), and a memory control processor. As another example, the memory unit 130 may be configured by a RAM, a Dynamic RAM (DRAM), a ROM, a flash memory, a volatile memory, a non-volatile memory, and/or a combination thereof.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAP-DRAGON™ series of processors made by Qualcomm®, EXYNOS™ series of processors made by Samsung®, A series of processors made by Apple®, HELIOT™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

The 6G wireless communication system (hereinafter referred to simply as 6G) aims to enable (i) very high data rates per device, (ii) a very large number of connected devices, (iii) global connectivity, (iv) very low latency, (v) reduced energy consumption for battery-free IoT devices, (vi) ultra-reliable connectivity, and (vii) connected intelligence with machine learning capabilities. 6G may include four aspects: intelligent connectivity, deep connectivity, holographic connectivity, and ubiquitous connectivity. In addition to 5G's main categories of eMBB. URLLC, and mMTC, 6G may also include AI integrated communication, tactile internet, high throughput, high network capacity, high energy efficiency, low backhaul and access network congestion, and enhanced data security as key factors.

As part of the core technology for 6G, Optical Wireless Communication (OWC) may be used. OWC is already in use since 4G, but is expected to be more widely used to meet the requirements of 6G. In addition to RF-based communication for all device-to-access networks possible in 6G. OWC may be applied for network-to-backhaul/fronthaul network connections. OWC-related technologies such as light fidelity, visible light communication, optical camera communication, and FSO communication based on optical bands are already well known. OWC-based communication may provide very high data rates, low latency, and secure communication. In addition, in 6G, Light Detection And Ranging (LiDAR) may be utilized for ultra-high resolution 3D mapping based on the optical band.

Hereinafter, the following symbols/abbreviations/terms are used in the present disclosure.

OF: Optical Frequency
OWC: Optical Wireless Communication
NLOS: Non-Line of Sight
DSP: Digital Signal Processor
HP: Horizontal Polarization
VP: Vertical Polarization
RCP: Right-hand Circular Polarization
LCP: Left-hand Circular Polanzation
REP: Right-hand Elliptical Polarization
LEP: Left-hand Elliptical Polarization
LG: Laguerre Gaussian
HG: Hermite Gaussian
TIA: Transimpedance Amplifier Unlike RF communications in 3GPP LTE or NR, OWCs may use very small beamwidths. Unlike OWCs in fixed point environments, mobile OWCs that take mobility into account cannot use a fixed beam, and therefore require beam steering and beam tracking techniques for predefined cell areas.

Figure 5:
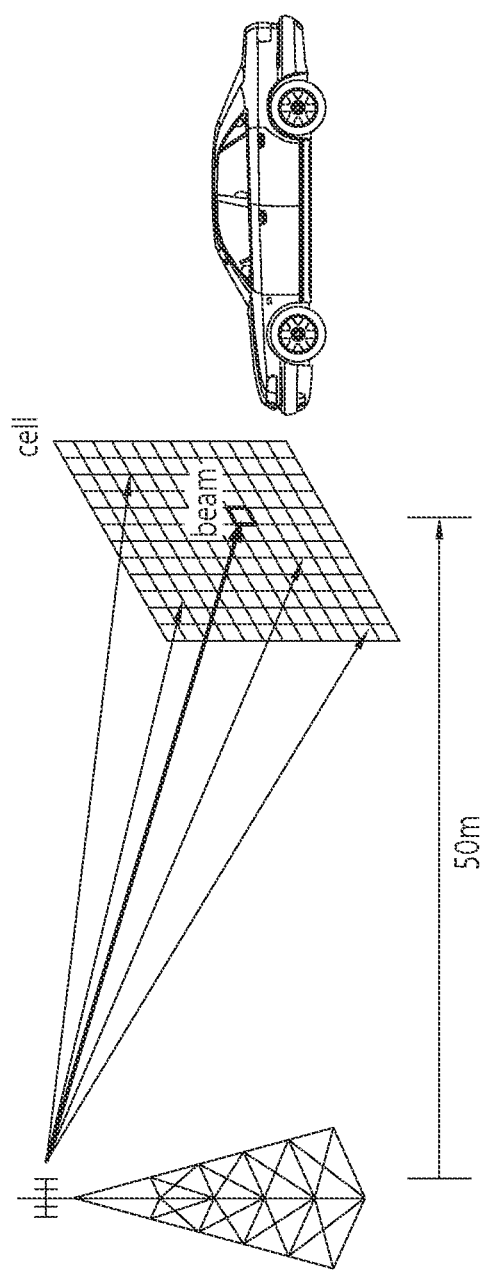
FIG. 5 shows an example of beam formation in a mobile OWC to which implementations of the present disclosure are applied.

FIG. 5 shows an example of beam formation in a mobile OWC to which implementations of the present disclosure are applied.

Referring to FIG. 5, it is assumed that the distance between the transmitting and receiving ends is 50 meters, and the transmitting end is transmitting a pencil beam with a half angle of beam divergence of about 100 micro-radians. The expected beam diameter at the receiving end is between 5 mm and 3.5 cm. Furthermore, for example, for a cell area of 1 $m^2$ near the receiving end location as shown in FIG. 5, there are 10,000 beams considering an aperture of 1 $cm^2$.

In systems that utilize fine beams, such as mobile OWC, terahertz (THz) communication systems, etc., as shown in FIG. 5, a large number of transmit and/or receive beams may exist within a single cell. In order to form a link between the transmitting and receiving ends, beam tracking is required to ensure beam alignment during the initial access phase and/or link maintenance phase. If the number of beams is very large, a large amount of beam search time may be required to verify the degree of alignment for each beam. For example, in 3GPP NR, in the step of performing beam tracking through the Synchronization Signal Block (SSB), a symbol-level beam tracking may be performed through as many symbols as there are beams. That is, referring to FIG. 5, beam tracking has to be performed for a time equivalent to 10,000 symbols, which may result in a very large loss of resources.

In addition, multi-stage beam search, where a broad beam is searched first and then a narrow beam is searched within the broad beam, requires handshaking between the transmitting and receiving ends, which may introduce delays.

As such, systems utilizing fine beams may need to address the resource loss and/or delay caused by a large number of beams.

Figure 6:
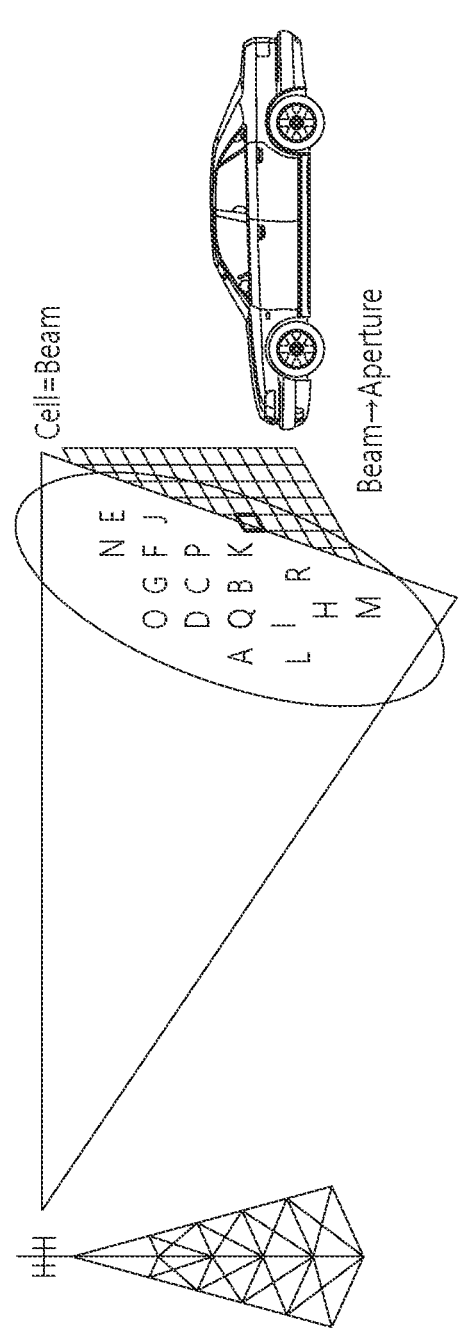
FIG. 6 shows an example of inhomogeneous beam formation to which implementations of the present disclosure are applied.

FIG. 6 shows an example of inhomogeneous beam formation to which implementations of the present disclosure are applied.

Referring to FIG. 6, the transmitting end transmits a wide inhomogeneous beam for beam search. The wide inhomogeneous beam may be transmitted over the entire cell area. The transmitted wide inhomogeneous beam may carry the letters 'A' through 'R', which represent different information (i.e., inhomogeneous information) depending on the location.

Depending on the position of the receive aperture at the receiving end, the information detected may be different. In FIG. 6, it is assumed that the position of the receive aperture is in the region of the beam where the information represented by 'K' is carried. The receiving end may detect the information ('K') through the receiving aperture and feedback it to the transmitting end. Thus, the transmitting may obtain the orientation of the link between the transmitting and receiving ends.

An inhomogeneous beam may be defined as an optical beam that has inhomogeneous information about the wavefront perpendicular to the optical axis of the optical beam from the transmitting and receiving perspectives. In general, a beam consisting of inhomogeneous information may be called an inhomogeneous beam in an environment where the physical resources that distinguish beams in beam search are the same in time, frequency, and/or space. The inhomogeneous information transmitted over the inhomogeneous beam may include at least one of intensity, phase, and polarization.

When the inhomogeneous information is organized as intensity and/or phase, changes in intensity and/or phase may occur as a function of distance between the transmitting and receiving ends. Accordingly, it is not possible to distinguish between changes in intensity and/or phase due to position relative to the optical axis and changes due to distance. On the other hand, when inhomogeneous information is organized as polarization, the polarization does not vary with the distance between the transmitting and receiving ends. Therefore, inhomogeneous polarization may be used as inhomogeneous information that is independent of the distance and/or channel between the transmitting and receiving ends.

A signal with arbitrary polarization may be represented as the sum of two arbitrary polarization signals for a single signal. For example, it may be represented that polarization 1+polarization 2=superposed polarization (for homogeneous symbols). Mathematically, this may be expressed as Equation 1.

$$A_m e^{-j\theta_m} \left| P_m \right\rangle + A_n e^{-j\theta_n} \left| P_n \right\rangle = A_c e^{-j\theta_c} \left| P_c \right\rangle \qquad \text{[Equation 1]}$$

In Equation 1, $A_m$, $A_n$, and $A_c$ denote the amplitudes of the m-th and n-th signals and the amplitude of the superposed signal, respectively. $\theta_m$, $\theta_n$, $\theta_c$, denote the phase of the m-th and n-th signals and the phase of the superimposed signal and n-th signals and the phase of the superimposed signal, respectively. $|P_m\rangle$, $|P_n\rangle$, $|P_c\rangle$ denote the polarization of the m-th and n-th signals and the polarization of the superimposed signal expressed as Jones Vectors, respectively.

Depending on the difference in amplitude and/or phase of each polanzation, the characteristics of the superimposed polarization may vary. Equation 2 is an example of superimposed polarization.

$$A_1 e^{-j\theta_1} \left| H \right\rangle + A_2 e^{-j\theta_2} \left| V \right\rangle = \left| +45 \right\rangle, \qquad \text{[Equation 2]}$$

for $$\theta_1 = \theta_2 \text{ and } A_1 = A_2$$

$$A_1 e^{-j\theta_1} \left| H \right\rangle + A_2 e^{-j\theta_2} \left| V \right\rangle = \left| -45 \right\rangle, \text{ for } \theta_1 + \pi = \theta_2 \text{ and } A_1 = A_2$$

$$A_1 e^{-j\theta_1} \left| H \right\rangle + A_2 e^{-j\theta_2} \left| V \right\rangle = \left| RCP \right\rangle, \text{ for } \theta_1 + \pi/2 = \theta_2 \text{ and } A_1 = A_2$$

$$A_1 e^{-j\theta_1} \left| H \right\rangle + A_2 e^{-j\theta_2} \left| V \right\rangle = \left| LCP \right\rangle, \text{ for } \theta_1 - \pi/2 = \theta_2 \text{ and } A_1 = A_2$$

$$A_1 e^{-j\theta_1} \left| RCP \right\rangle + A_2 e^{-j\theta_2} \left| LCP \right\rangle = \left| REP \right\rangle, \text{ for } \theta_1 = \theta_2 \text{ and } A_1 > A_2$$

$$A_1 e^{-j\theta_1} \left| RCP \right\rangle + A_2 e^{-j\theta_2} \left| LCP \right\rangle = \left| LEP \right\rangle, \text{ for } \theta_1 = \theta_2 \text{ and } A_1 < A_2$$

In Equation 2, $|H\rangle$, $|V\rangle$, $|45+\rangle$, and $-45\rangle$ represent the horizontal polarization, vertical polarization, +45-degree polarization, and −45-degree polarization relative to the x-axis for linear polarization, respectively, $|RCP\rangle$, $|LCP\rangle$ denote right circular polarization and left circular polarization, respectively, $|REP\rangle$, $|LEP\rangle$ denote right elliptical polarization and left elliptical polarization, respectively.

A beam that expresses all the different characteristics of superimposed polarizations according to difference in amplitude and/or phase of each polarization may be defined as a Poincare beam. Furthermore, the sphere that represents all cases of Poincare beams may be defined as a Poincare sphere.

Then, given two basis polarizations, RCP and LCP, a Poincare sphere may be plotted based on the amplitude and phase difference of each basis polarization. In addition, the Stokes parameters $[S_0, S_1, S_2, S_3]$ may be defined to represent all polarization states on the Poincare sphere as shown in Equation 3.

$$S_0 = E_x^2 + E_y^2 \qquad \text{[Equation 3]}$$

$$S_1 = E_x^2 - E_y^2$$

$$S_2 = 2E_x E_y \cos \delta$$

$$S_3 = 2E_x E_y \sin \delta$$

In Equation 3, $E_x$, $E_y$ represent the E-field in the x-axis direction and the E-field in the y-axis direction, which generally correspond to horizontal and vertical polarization, respectively. $\delta$ represents the phase difference between $E_x$ and $E_y$. Thus, $S_0$ represents the total intensity of the polarization state, $S_1$ represents the ratio difference between horizontal and vertical polarization, $S_2$ represents the ratio difference between +45 degree straight polarization and −45 degree straight polarization, and $S_3$ represents the ratio difference between RCP and LCP.

If the Stokes parameters described in Equation 3 are expressed in the spherical coordinate system of the Poincare sphere, they may be expressed as shown in Equation 4.

$$S_0 = I \qquad \text{[Equation 4]}$$
$$S_1 = Ip \; \cos 2\Psi \cos 2X$$
$$S_2 = Ip \; \sin 2\Psi \cos 2X$$
$$S_3 = Ip \; \sin 2X$$

In Equation 4, 1 represents the total intensity of the polarization state. p is the degree of polarization, which indicates the degree of polarization of the signal. p=0 indicates unpolarized, 0<p<1 indicates partially polarized, and p=1 indicates fully polarized. $\Psi$ is the orientation angle, which indicates the elliptical direction of the elliptical polarization. X is the ellipticity angle, which describes the degree of ellipticity of the elliptical polarization. Thus, $\Psi$ and X are independent of the total intensity I and the polarization angle p, and may be defined as the angle with respect to the $S_1$ axis on a Poincare sphere of fixed size 1. For the purposes of the present disclosure, $\Psi$ and X may be defined as Poincare sphere angles.

Extending the concept of superposition of polarizations to wavefronts for an arbitrary beam, the following example may be shown.

For example, if wavefront 1 is a plane wave horizontally polarized with θ1, and wavefront 2 is a plane wave vertically polarized with θ2, the superposed polarization results in RCP wavefront. $\theta_i + \pi/2 = \theta_{i+1}$ is assumed, that is, if each homogeneously polarized wavefront has homogeneous polarization, the superimposed wavefronts also have homogeneous polarization.

On the other hand, if the wavefronts have inhomogeneous phases, it may look like as follows. Here, inhomogeneous phase may be defined as unequal phases within the same wavefront, which may be, e.g., LG beams and/or HG beams.

For example, if wavefront 1 is a plane wave horizontally polarized with θ1 and wavefront 2 is a helical wave vertically polarized with θ1 to θ4, the superimposed polarization results in an inhomogeneously polarized wavefront. $\theta_i + \pi/2 = \theta_{i+1}$ is assumed, that is, if each homogeneous polarized wavefront has an inhomogeneous phase, there may be different phase differences at different locations within the superimposed wavefront, which may cause the superimposed polarization to change at different locations within the superimposed wavefront, resulting in inhomogeneous polarization.

For example, an LG beam is a Gaussian beam with an Orbital Angular Momentum (OAM) characteristic, where the phase is rotated within the wavefront according to a phase rotation characteristic parameter called the LG beam order or OAM order or topological charge. A plane wave or plane phasefront means that all electromagnetic waves have the same phase in a wavefront in which electromagnetic waves (or photons) propagate at the same time. Electromagnetic waves that are not plane waves are called helical waves, and in general, helical waves are electromagnetic waves with an OAM. Since OAM is a definition of the wavefront, the electromagnetic wave at each point may be linearly polarized or circularly polarized. By optical definition, OAMs may be referred to as LG beams or cylindrical transverse mode patterns. The cylindrical transverse mode pattern may be represented by TEM(pl)). In the present disclosure, TEM(pl) is defined as TEM(pl) where p=0 and l is a value corresponding to the LG beam order. For example, LG beam order 3 or OAM mode 3 may be represented by TEM(03). The LG beam order is an integer value such that the direction of rotation of the phase within the wavefront when it is negative is opposite to the direction when it is positive.

Alternatively, two or more homogeneously polarized wavefronts may be superimposed to generate an inhomogeneously polarized wavefront. Depending on the number and configuration of the superimposed homogeneously polarized wavefronts, the distribution of polarization states of the superimposed beam may be different. Furthermore, the optical axes or centers of the beams may be aligned identically or may be arbitrarily skewed, and the distribution of polarization states of the superimposed beams may vary accordingly. Furthermore, the fundamental polarizations of the homogeneously polarized wavefronts may be orthogonal or non-orthogonal to each other, and the distribution of polarization states of the superimposed beams may be different depending on the fundamental polarization used. Furthermore, the distribution of polarization states of the superimposed beams may vary depending on the initial phase value of each wavefront. Furthermore, the distribution of polarization states of the superimposed beams may be different depending on the initial amplitude value of each wavefront. Furthermore, the distribution of polarization states of the superimposed beams may be different depending on the distribution of inhomogeneous phases of each wavefront.

The inhomogeneous polarization may be generated on a wavefront-by-wavefront basis. In the present disclosure, inhomogeneous polarization generated on a wavefront-by-wavefront basis is defined as an inhomogeneous polarization pattern.

Figure 7:
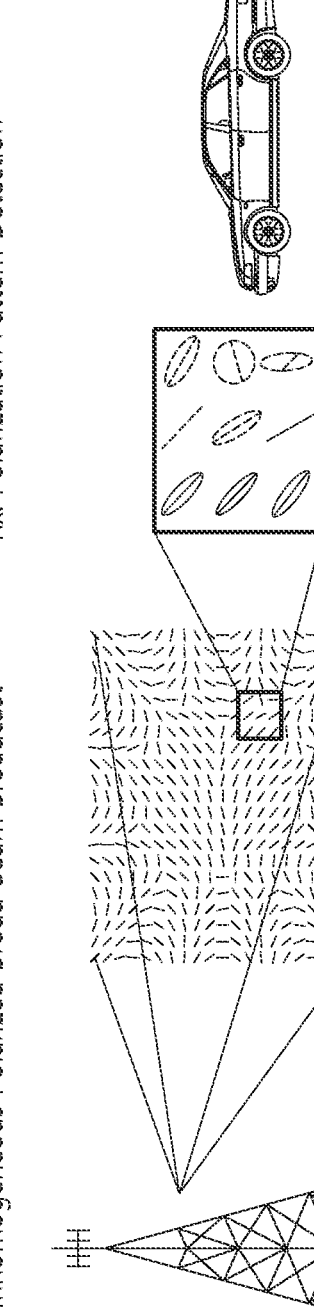
FIG. 7 shows an example of beam alignment using an inhomogeneous polarization pattern to which implementations of the present disclosure are applied.

FIG. 7 shows an example of beam alignment using an inhomogeneous polarization pattern to which implementations of the present disclosure are applied.

Referring to FIG. 7, the beam alignment may be performed as follows.

(1) The transmitting end transmits an inhomogeneously polarized wide beam generated using the inhomogeneous polarization described above.

(2) The receiving end detects the polarization state or inhomogeneous polarization pattern where it is located. In the polarization state detected in FIG. 7, the polarization state in the solid line corresponds to RCP and the polarization state in the dashed line corresponds to LCP.

(3) The receiving end feedbacks the polarization information detected through the inhomogeneous polarization pattern or Stokes parameter to the transmitting end.

(4) Based on the feedback polarization information, the transmitting end detects the position of the inhomogeneous polarization pattern in the transmitted inhomogeneously polarized wide beam and performs beam alignment by recognizing the direction of the beam to the receiving end. Accordingly, the beams at the transmitting end and the receiving end may finally be aligned.

Figure 8:
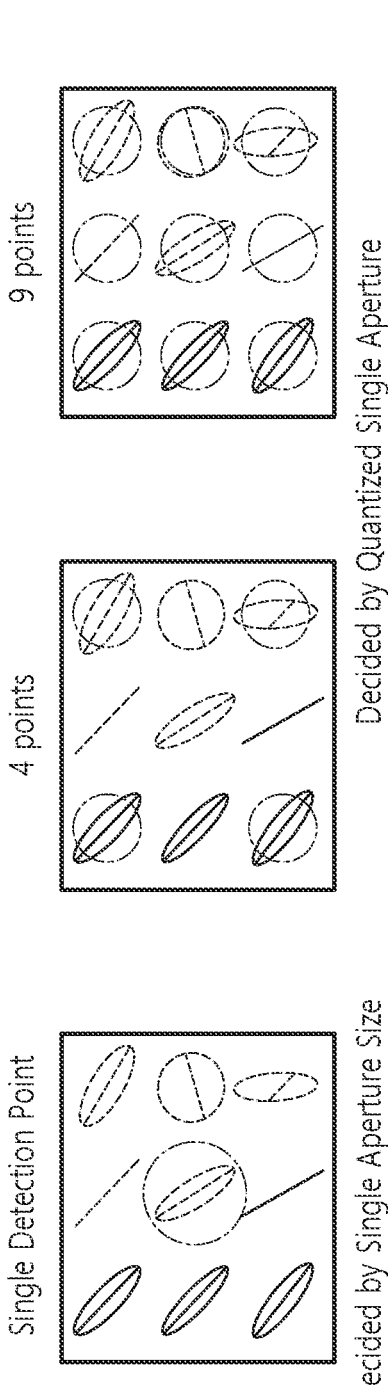
FIG. 8 shows an example of a receiving end recognizing a polarization state to which implementations of the present disclosure are applied.

FIG. 8 shows an example of a receiving end recognizing a polarization state to which implementations of the present disclosure are applied.

Referring to FIG. 8, the receiving end may recognize the polarization state via a Stokes parameter.

If the receiving end detects a single polarization state through a single receiver aperture, the receiving may feedback the single polarization state to the transmitting end. The receiving end may feedback a Stokes vector to the transmitting end based on the measured Stokes parameters. The Stokes vector is a vector containing all of the Stokes parameters, and is used to carry polarization state information and total intensity. The Stokes vector may be defined by Equation 5.

$$S = [S_0, S_1, S_2, S_3] \qquad \text{[Equation 5]}$$

Alternatively, the receiving end may feedback a Poincare sphere angle vector to the transmitting based on the measured Stokes parameters. The Poincare sphere angle vector is a vector representing only the polarization state information on the unit Poincare sphere, and is used to carry only the polarization state information without the total intensity. The Poincare sphere angle vector may be defined by Equation 6.

$$\Omega = [\Psi, X] \qquad \text{[Equation 6]}$$

In Equation 6, Y is the orientation angle, which represents the elliptical direction of the elliptical polarization, expressed as Equation 7.

$$\Psi = \frac{1}{2}\arctan\left(\frac{S_2}{S_1}\right) \qquad \text{[Equation 7]}$$

In Equation 6, X is the ellipticity angle, which represents the degree of ellipticity of the elliptical polarization, expressed as Equation 8.

$$X = \frac{1}{2}\arctan\left(\frac{S_3}{\sqrt{S_1{}^2 + S_2{}^2}}\right) \qquad \text{[Equation 8]}$$

Alternatively, if the receiving end detects the multiple polarization states through multiple receiver apertures and/ or through a plurality of photodetector arrays in a single receiver aperture, the receiving end may feedback the multiple polarization states to the transmitting end. The receiving end may feedback a Stokes vector to the transmitting end based on the measured Stokes parameters. The Stokes vector for M polarization detection points may be defined by Equation 9.

$$S_i = \left[S_0{}^{(i)}, S_1{}^{(i)}, S_2{}^{(i)}, S_3{}^{(i)}\right] \qquad \text{[Equation 9]}$$

Alternatively, the receiving end may feedback a Poincare sphere angle vector to the transmitting end based on the measured Stokes parameters. The Poincare sphere angle vector for M polarization detection points may be defined by Equation 10.

$$\Omega_i = \left[\Psi^{(i)}, X^{(i)}\right] \qquad \text{[Equation 10]}$$

In Equation 10, $\Psi(i)$ is the orientation angle and represents the elliptic direction of the i-th elliptical polarization, expressed in Equation 11.

$$\Psi^{(i)} = \frac{1}{2}\arctan\left(\frac{S_2{}^{(i)}}{S_1{}^{(i)}}\right) \qquad \text{[Equation 11]}$$

In Equation 12, $X^{(i)}$ is the ellipticity angle, and represents the ellipticity degree of the i-th elliptical polarization, expressed in Equation 12.

$$X^{(i)} = \frac{1}{2}\arctan\left(\frac{S_3{}^{(i)}}{\sqrt{\left(S_1{}^{(i)}\right)^2 + \left(S_2{}^{(i)}\right)^2}}\right) \qquad \text{[Equation 12]}$$

The feedback information transmitted by the receiving end to the transmitting end may be quantized and transmitted by a predetermined method. Alternatively, the feedback information transmitted by the receiving end to the transmitting end may be quantized and indexed by a predetermined method.

If the transmitting end performs beam search, the transmitting end searches for a beam direction to the receiving end from the inhomogeneous polarization pattern transmitted by the transmitting end based on the polarization state information received in the feedback. Alternatively, if the receiving end performs beam search, the receiving end searches for a beam direction to the receiving end from the inhomogeneous polarization pattern transmitted by the transmitting end based on the polarization state information detected by the receiving end.

Figure 9:
FIG. 9 shows an example of searching for a beam direction based on an inhomogeneous polarization pattern at a single polarization detection point to which implementations of the present disclosure are applied.

FIG. 9 shows an example of searching for a beam direction based on an inhomogeneous polarization pattern at a single polarization detection point to which implementations of the present disclosure are applied.

Referring to FIG. 9, based on the polarization state information detected and/or fed back at the single polarization detection point, a beam direction from the transmitting end to the receiving end may be detected from the inhomogeneous polarization pattern. For example, the inhomogeneous polarization pattern may be quantized and pre-mapped into a high resolution polarization pattern matrix, as shown in FIG. 9.

By comparing the detected and/or fed back polarization state information with each polarization in the high-resolution polarization pattern matrix, the most similar polarization state may be selected. For example, the index of the most similar polarization state may be selected based on a Euclidean distance, as shown in Equation 13.

$$(i, j) = \qquad \text{[Equation 13]}$$

$$\arg\min_{i,j}$$

$$\sqrt{\left(P_{i,j}(S_1) - S_1{}^{(detected)}\right)^2 + \left(P_{i,j}(S_2) - S_2{}^{(detected)}\right)^2 + \left(P_{i,j}(S_3) - S_3{}^{(detected)}\right)^2},$$

$$i, j = 1, \ \ldots, N$$

In Equation 13, $P_{i,j}(S_k)$ denotes the k-th Stokes parameter of the (i,j)-th polarization state of the high-resolution polarization pattern matrix. $S_k{}^{(detected)}$ denotes the k-th Stokes parameter derived from the detected and/or fed back polarization state information. Here, the Stokes parameters are $[S_0, S_1, S_2, S_3]$, where $S_0$ represents the total intensity, and $S_1$ through $S_3$ corresponding to the polarization states are used for polarization detection.

Alternatively, a polarization state index may also be selected by measuring the similarity of the detected and/or fed back polarization state information in terms of the Poincare sphere angle vector.

From the selected polarization state index in the high-resolution polarization pattern matrix, a beam index may be determined. For example, if the polarization state index of the high-resolution polarization pattern matrix and the beam index are mapped as 1:1, the beam index may be selected by Equation 14.

$$b = (i-1)*N + (j-1)*N, \quad i, j = 1, \ldots, N, \quad b = 1, \ldots, N^2 \quad \text{[Equation 14]}$$

Alternatively, the polarization state index of the high-resolution polarization pattern matrix and beam index may be mapped as M:1 (M>1). In this case, the resolution of the selection of the beam index may be lower than the resolution of the selection of the polarization state index.

If the search for the beam direction described above is performed at the transmitting end, the transmitting end may perform transmit beamforming toward the receiving end with the selected beam index. Alternatively, if the search for the beam direction described above is performed at the receiving end, the receiving end may request transmit beamforming by feeding the selected beam index back to the transmitting end.

Figure 10:
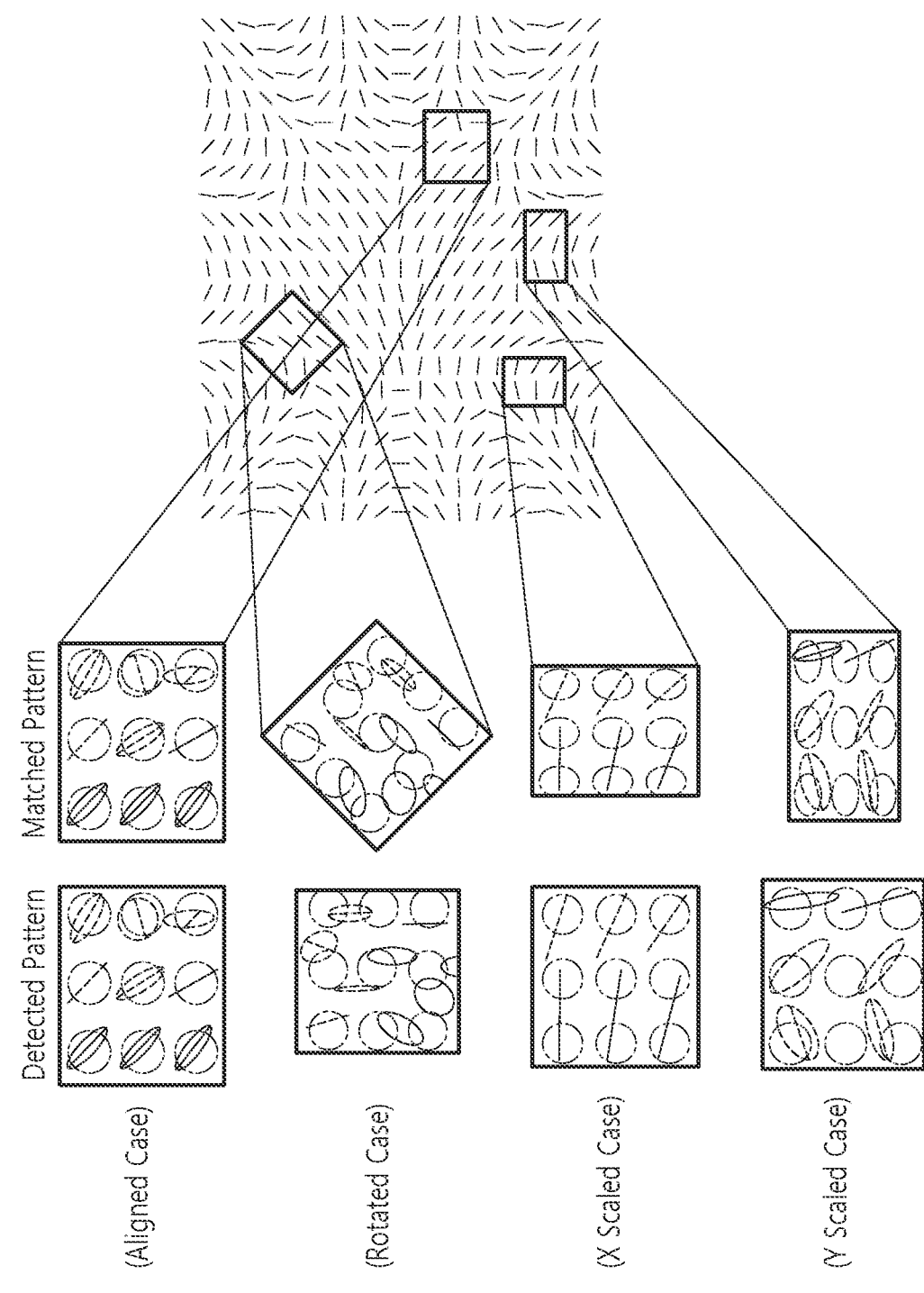
FIG. 10 shows an example of searching for a beam direction based on an inhomogeneous polarization pattern at multiple polarization detection points to which implementations of the present disclosure are applied.

FIG. 10 shows an example of searching for a beam direction based on an inhomogeneous polarization pattern at multiple polarization detection points to which implementations of the present disclosure are applied.

Referring to FIG. 10, based on the polarization state information detected and/or fed back from the multiple polarization detection points, a beam direction from the transmitting end to the receiving end may be detected from the inhomogeneous polarization pattern. For example, in FIG. 10, where nine Stokes vectors for each of the nine points are detected and/or fed back, a pattern may be detected based on the degree of alignment of the transmitting end and receiving end.

In the aligned case, where the transmitting end and the receiving end are aligned facing each other, the beam direction may be detected directly from the pattern detected in the inhomogeneous polarization pattern. On the other hand, in the rotated case, where the transmitting end and the receiving end are facing each other but the receiving end is rotated from the perspective of the multiple polarization detection points, the beam direction may be detected by considering the rotation of the pattern detected from the inhomogeneous polarization pattern. Also, if the axis between the transmitting end and the receiving end is the Z axis and the receiving end is tilting in the X axis or the Y axis, the pattern detected at the receiving end is scaled in the X axis or the Y axis (X Scaled case or Y Scaled case), so the beam direction may be detected by considering the scaling in the X axis or the Y axis of the pattern detected in the inhomogeneous polarization pattern. Also, depending on the distance between the transmitting end and the receiving end, adjustment may occur along the X-axis or Y-axis, so the beam direction may be detected by considering the adjustment along the X-axis or Y-axis of the detected pattern in the inhomogeneous polarization pattern.

Thus, based on the polarization state information detected and/or fed back from the multiple polarization detection points, not only the beam direction from the inhomogeneous polarization pattern to the receiving end, but also the rotation, tilt, and/or distance information of the receiving end may be obtained. This enables localization of the receiving end to be performed.

The selection of the polarization state at the multiple polarization detection points may be performed by measuring the pattern-to-pattern (or matrix-to-matrix or vector-to-vector) similarity, the same as the detection of the polarization state at the single polarization detection point described in FIG. 9. Based on the selected polarization state, a beam may be selected, and feedback may be performed, identical to the beam selection at the single polarization detection point.

As described above in FIGS. 7 to 10, beam alignment based on inhomogeneous polarization may search for the beam direction from the transmitting end to the receiving end based on the polarization state. On the other hand, conventional beam search may be performed through energy detection of signals repeatedly transmitted over some geometric resource.

Figure 11:
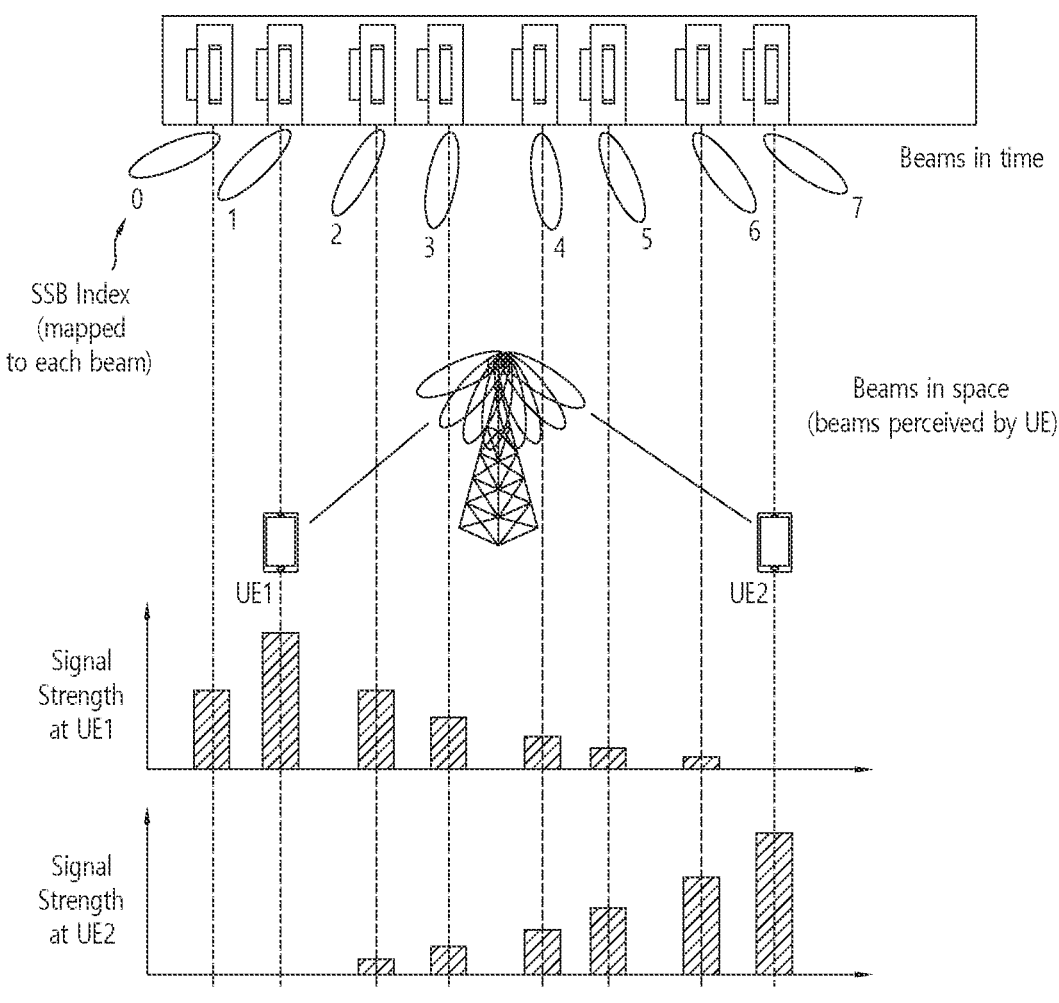
FIG. 11 shows an example of beam search in 3GPP NR to which implementations of the present disclosure are applied.

FIG. 11 shows an example of beam search in 3GPP NR to which implementations of the present disclosure are applied.

Referring to FIG. 11, the transmitting end (i.e., the base station) transmits an SSB over a predefined time/frequency resource. The SSB consists of a Primary Synchronization Signal (PSS), a Secondary Synchronization Signal (SSS), and a Physical Broadcast Channel (PBCH). The PSS and SSS are m-sequences assigned to 127 subcarriers respectively, and are used to obtain downlink frame synchronization and physical cell ID. PBCH is used to carry MIB information.

FIG. 11 shows an example where eight SSBs are transmitted over a predefined time/frequency region. Each SSB carries a different beam, which may be transmitted over different resources. The SSB indices may be mapped to beam indices. Each receiving end (i.e., UE) in the cell may detect the beams by measuring the signal strength for each beam on the physical resource that is committed to carrying the SSB. The UE may simultaneously obtain the cell ID and downlink frame synchronization by cross-correlation of each of the 127 m-sequences of PSS and SSS. The cell ID is obtained based on the m-sequence index with the highest cross-correlation for each SSB index, and the signal strength may be determined based on the highest cross-correlation obtained for each SSB index. The UEs may then feedback the signal strength obtained for each SSB index to the base station, and the base station may determine the best aligned beam with each UE based on the received feedback. The number of signal strengths fed back by each UE may be different.

For example, in FIG. 11, UE1 and UE2 measure the signal strength of the PSS and SSS for each SSB. The measurement of the signal strength of the PSS and SSS is measured for the sequence granularity for each PSS and SSS. The signal strength measurements show that UE1 is more likely to be located in the direction of the beam corresponding to the SSB index 1 with the highest signal strength, and UE2 is more likely to be located in the direction of the beam corresponding to the SSB index 7 with the highest signal strength.

As described in FIG. 11, in order to measure the signal strength, it is necessary to be able to measure the cross-correlation over the m-sequence, which may require conveying not only the magnitude of the signal but also the phase information, such as in an m-sequence comprising Binary Phase Shift Keying (BPSK) or a Zadoff-Chu (ZC) sequence comprising complex numbers.

Hereinafter, according to various implementations of the present disclosure, transmission and reception methods that support the transmission of phase information in systems that perform beam alignment based on inhomogeneous polarization and/or devices supporting the same are described. In addition, according to various implementations of the present disclosure, methods of operating with combination of inhomogeneous polarization and a system performing beam alignment based on conventional signal strength and/or devices supporting the same are described The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
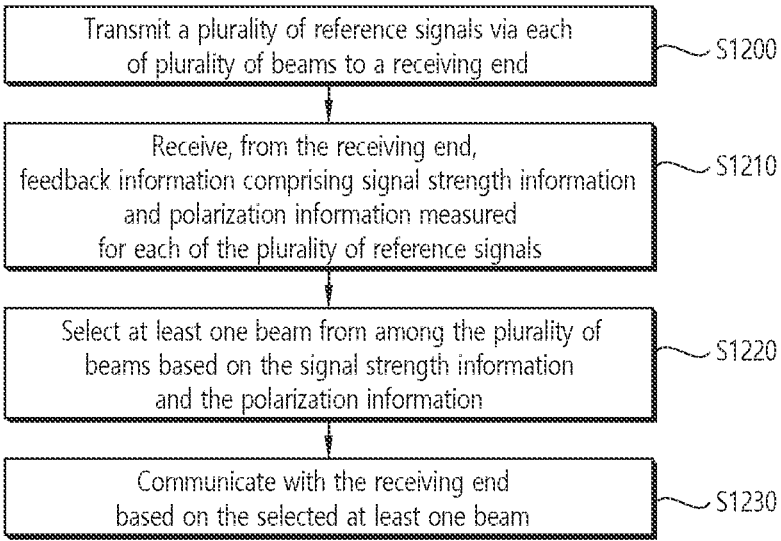
FIG. 12 shows a method performed by a transmitting end to which implementations of the present disclosure are applied.

FIG. 12 shows a method performed by a transmitting end to which implementations of the present disclosure are applied.

In step S1200, the method comprises transmitting a plurality of reference signals via each of plurality of beams to a receiving end.

In step S1210, the method comprises receiving, from the receiving end, feedback information comprising signal strength information and polarization information measured for each of the plurality of reference signals.

In step S1220, the method comprises selecting at least one beam from among the plurality of beams based on the signal strength information and the polarization information.

In step S1230, the method comprises communicating with the receiving end based on the selected at least one beam.

In some implementations, each of the plurality of beams may have a same inhomogeneous polarization beam pattern.

In some implementations, each of the plurality of beams may have a different inhomogeneous polarization beam pattern. The different inhomogeneous beam polarization patterns may overlap or may not overlap in space.

In some implementations, selecting the at least one beam may comprise: selecting at least one reference signal from among the plurality of reference signals based on the signal intensity information, selecting a beam index matrix associated with an index of the selected at least one reference signal, and selecting an index of the at least one beam based on the polarization information within the selected beam index matrix. Selecting the beam index matrix may comprise selecting a high resolution polarization pattern matrix associated with the index of the selected at least one reference signal.

In some implementations, the transmitting end may comprise an inhomogeneous polarization beam generator coupled with an intensity modulator. The plurality of reference signals having an intensity signal may be transmitted via an inhomogeneous polarization beam pattern corresponding to each of the plurality of beams, by the inhomogeneous polarization beam generator coupled with the intensity modulator.

In some implementations, the transmitting end may comprise an inhomogeneous polarization beam generator coupled with an In-phase/Quadrature (IQ) modulator. The plurality of reference signals having a complex signal may be transmitted via an inhomogeneous polarization beam pattern corresponding to each of the plurality of beams, by the inhomogeneous polarization beam generator coupled with the IQ modulator.

Figure 13:
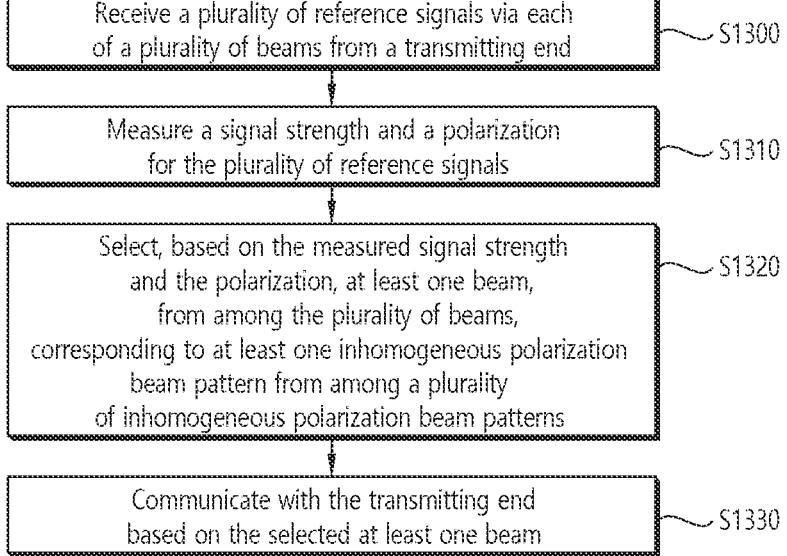
FIG. 13 shows a method performed by a receiving end to which implementations of the present disclosure are applied.

FIG. 13 shows a method performed by a receiving end to which implementations of the present disclosure are applied.

In step S1300, the method comprises receiving a plurality of reference signals via each of a plurality of beams from a transmitting end.

In step S1310, the method comprises measuring a signal strength and a polarization for the plurality of reference signals.

In step S1320, the method comprises selecting, based on the measured signal strength and the polarization, at least one beam, from among the plurality of beams, corresponding to at least one inhomogeneous polarization beam pattern from among a plurality of inhomogeneous polarization beam patterns.

In step S1330, the method comprises communicating with the transmitting end based on the selected at least one beam.

In some implementations, the plurality of inhomogeneous polarization beam patterns may be identical.

In some implementations, the plurality of inhomogeneous polarization beam patterns may be different from each other. The plurality of inhomogeneous polarization beam patterns may overlap or may not overlap in space.

In some implementations, selecting the at least one beam may comprise: selecting at least one reference signal from among the plurality of reference signals based on the measured signal strength, selecting a beam index matrix associated with an index of the selected at least one reference signal, and selecting an index of the at least one beam based on the measured polarization within the selected beam index matrix. Selecting the beam index matrix may comprise selecting a high resolution polarization pattern matrix associated with the index of the selected at least one reference signal.

In some implementations, the receiving end may comprise at least one polarization filter and at least one photo detector, and information about the polarization may be measured based on a power output by a signal modulated with intensity passing through the at least one polarization filter and the at least one photo detector.

In some implementations, the receiving end may comprise at least one polarization filter and at least one coherent detector, and information about the polarization may be measured based on the power output by an in-phase and quadrature modulated complex signal passing through the at least one polarization filter and the at least one coherent detector. The at least one coherent detector may comprise a 3 dB coupler and a balanced photodetector.

Hereinafter, various implementations of the present disclosure will be described.

1. First Implementation: Method for Aligning Beams Based on Inhomogeneous Polarization and Signal Strength According to the first implementation of the present disclosure, a method is provided for operating an inhomogeneous polarization beam applied to a conventional beam alignment based on signal strength.

When applying an inhomogeneous polarization beam to a method of operating a plurality of beams for beam alignment and measuring each beam based on signal strength, the method of operating the plurality of beams at the transmitting end may be divided into three examples as follows.

(1) First Example: A Plurality of Beams with a Single Inhomogeneous Polarization Pattern FIG. 14 shows an example in which a plurality of beams having a single inhomogeneous polarization pattern is transmitted in different areas and detected by a receiving end to which the first implementation of the present disclosure is applied.

Figure 14:
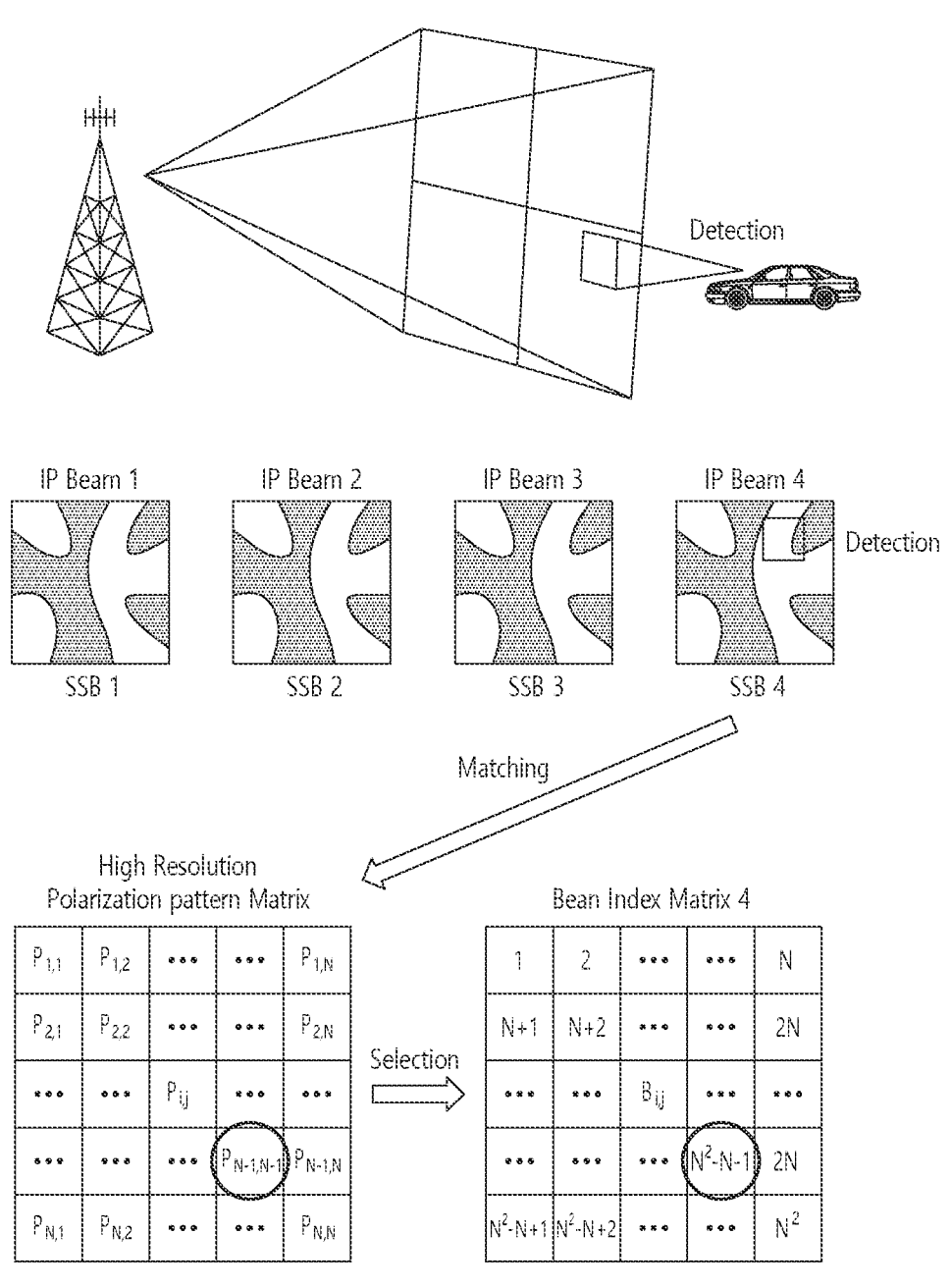
FIG. 14 shows an example in which a plurality of beams having a single inhomogeneous polarization pattern is transmitted in different areas and detected by a receiving end to which the first implementation of the present disclosure is applied.

Referring to FIG. 14, the transmitting end may transmit beams having a single inhomogeneous polarization pattern in four different regions (e.g., space) over four different physical resources (e.g., time/frequency). The receiving end may perform beam tracking over pre-assigned/configured physical resources for beam alignment.

For example, in the case of 3GPP NR, the transmitting may transmit SSB in pre-configured physical resources. The receiving end may measure/acquire the signal strength of each SSB through cross-correlation over pre-configured m-sequences. Further, the receiving end may obtain polarization information for each SSB. The receiving end may feedback the measured/acquired signal strength and polarization information for each SSB to the transmitting end. In this case, the receiving end may perform the feedback for all SSBs and/or only for a pre-configured number of SSBs.

The structure of the transmitting end transmitting beams having an inhomogeneous polarization pattern and/or the structure of the receiving end measuring/acquiring signal strength and polarization information of the received beams will be described later in the second implementation of the present disclosure below.

In FIG. 14, when four SSBs are transmitted in different areas, the inhomogeneous polarization beam used by all SSBs is the same. That is, the transmitting uses the same inhomogeneous polarization beam to transmit SSB 1 to SSB 4. When the receiving measures the signal strength for each SSB, the index of SSB 4 with the highest signal strength may be selected. Based on the polarization information measured at SSB 4, the receiving end may select an index for the polarization information from a pre-configured high-resolution polarization pattern matrix ($P_{N-1, N-1}$ in FIG. 14). Further, the receiving end may select a beam index matrix 4 associated with the selected SSB 4 from among the pre-configured beam index matrices, and may select a beam index based on the index for the polarization information selected in the selected beam index matrix 4 ($N^2-N-1$ in FIG. 14). In other words, the receiving end may select the SSB index and the beam index matrix associated therewith based on the signal strength, and may select the beam index within the selected beam index matrix based on the obtained polarization information.

a) When Beam Alignment is Performed at the Transmitting End:

The transmitting transmits the same inhomogeneous polarization beam at each SSB, the receiving feeds back the measured signal strength and polarization information, and the transmitting may perform beam alignment based on the feedback information.

The information fed back by the receiving end may be the measured signal strength and polarization information at SSB x (x=1 . . . , max(SSB index)). The receiving may feedback the measured signal strength and polarization state information for each SSB to the transmitting via pre-configured physical resources (e.g., time/frequency) or physical channels (e.g., xPUSCH (Physical Uplink Shared Channel) or xPUCCH (Physical Uplink Control Channel)).

The polarization state information may be polarization state information defined as a Stokes vector and/or a Poincare sphere angle vector. The signal strength and polarization state information may be quantized or indexed to be fed back. The amount of signal strength and polarization state information to be fed back may be pre-configured by the physical resources and/or physical channels over which the feedback information is transmitted.

b) Beam Alignment is Performed at the Receiving End:

The transmitting transmits the same inhomogeneous polarization beam at each SSB. The receiving end may measure the signal strength and polarization information, and perform beam selection/alignment based on information about the inhomogeneous polarization pattern pre-configured or received over the broadcast channel. The receiving end may feedback information about the selected beam to the transmitting end.

The information about the inhomogeneous polarization pattern may be pre-configured. The information about the inhomogeneous polarization pattern may be pre-configured at the design stage of the transmitting end and the receiving end.

Alternatively, the transmitting end and the receiving end may exchange information about the inhomogeneous polarization pattern in advance. The information about the inhomogeneous polarization pattern may be exchanged in advance during the initial access phase or through periodic broadcasting. For example, the information about the inhomogeneous polarization pattern may be exchanged via a Master Information Block (MIB) transmitted over xPBCH. For example, information about the inhomogeneous polarization pattern may be exchanged via a System Information Block (SIB) transmitted over the Physical Downlink Shared Channel (xPDSCH).

The information about the inhomogeneous polarization pattern may be quantized into a high-resolution polarization pattern matrix. Alternatively, the information about the inhomogeneous polarization pattern may be defined as information about a beam combination that produces the inhomogeneous polarization pattern. The information about the beam combination is the generation information of each beam used by the inhomogeneous polarization beam generator at the transmitting end. For example, for a particular element beam m, [m, $A_m$, $\theta_m$, $|P_m>$] may be -redefined. Here, m is the LG beam order of the element beam, $A_m$ is the amplitude information of the element beam in, $\theta_m$ is the phase information of the element beam m, and $|P_m>$ is the polarization information of the element beam m.

The receiving end may measure the signal strength and polarization information for each SSB through pre-configured physical resources (e.g., time/frequency) for beam alignment. The receiving end may select an SSB index based on the measured signal strength for the inhomogeneous polarization beam of each SSB, and may select a beam index matrix based on the SSB index. The relationship between the SSB index and the beam index matrix may be pre-configured.

Further, the receiving end may match the polarization information measured for the inhomogeneous polarization beam of each SSB with the configured/received inhomogeneous polarization pattern to search for the beam direction from the transmitting to the receiving end. Polarization matching may be performed on a high-resolution polarization pattern matrix.

The receiving may select a center direction of the beam for data transmission based on the selected beam index and the direction corresponding to the matched polarization. The receiving end may determine a pre-configured beam index based on the selected center direction of the beam. The relationship between the beam index and the orientation of polarization states or a pattern of polarization states may be pre-configured.

That is, polarization matching for a high-resolution polarization pattern matrix may indicate a beam index within a selected beam index matrix based on the SSB index. Since a single inhomogeneous polarization pattern is used, a single high-resolution polarization pattern matrix may be associated with multiple beam index matrices.

(2) Second Example: Plurality of Beams with a Plurality of Inhomogeneous Polarization Patterns FIG. 15 shows an example in which a plurality of beams having a plurality of inhomogeneous polarization patterns is transmitted in different areas and detected by a receiving end to which the first implementation of the present disclosure is applied.

Figure 15:
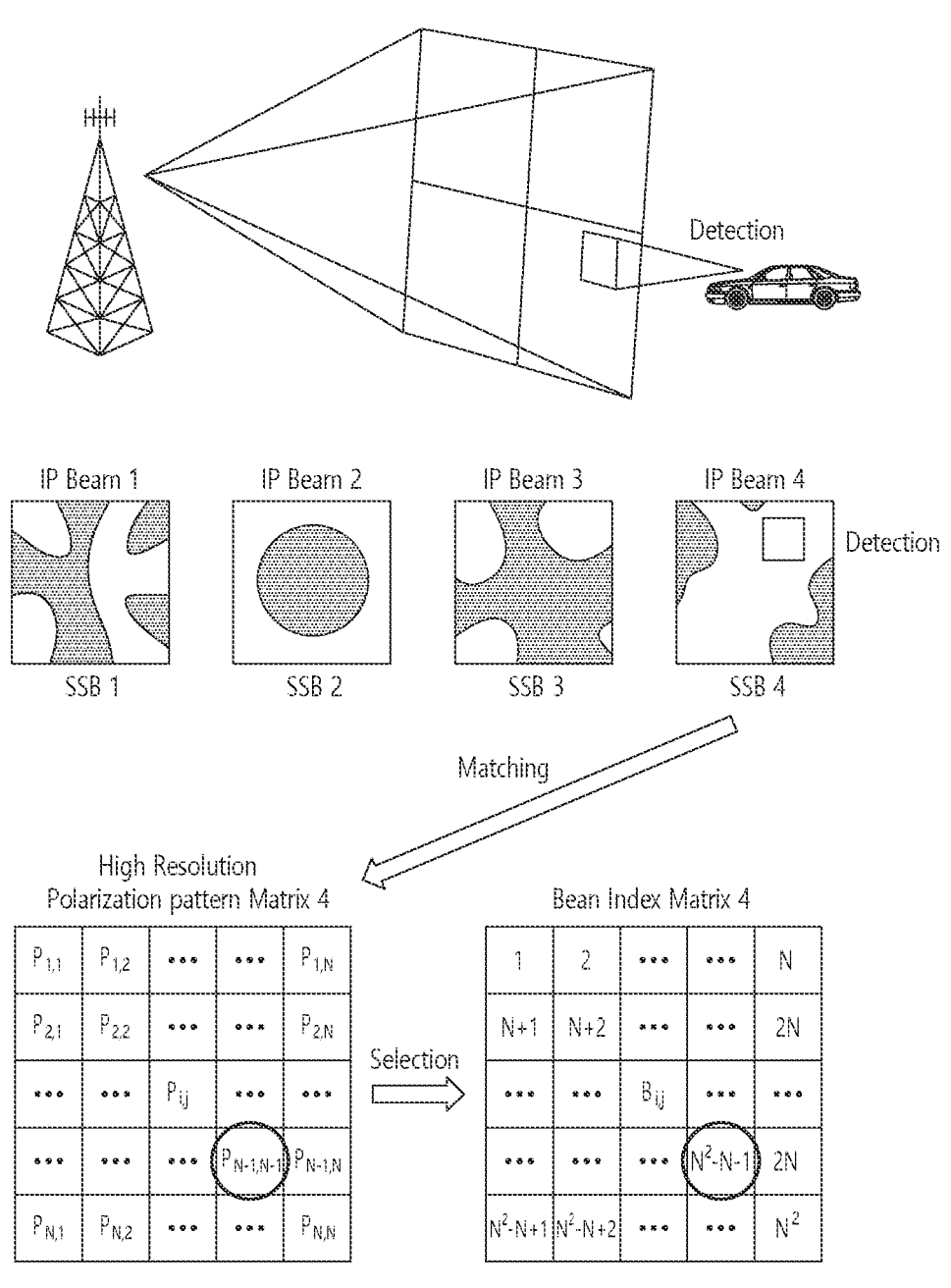
FIG. 15 shows an example in which a plurality of beams having a plurality of inhomogeneous polarization patterns is transmitted in different areas and detected by a receiving end to which the first implementation of the present disclosure is applied.

Referring to FIG. 15, the transmitting end may transmit beams with a single non-inhomogeneous polarization pattern in four different regions (e.g., space) over four different physical resources (e.g., time/frequency). The receiving end may perform beam tracking on the pre-assigned/configured physical resources for beam alignment. The operation of the transmitting/receiving ends is similar to the first example described above in FIG. 14, except that the inhomogeneous polarization patterns used by each SSB are different.

In FIG. 15, when four SSBs are transmitted in different areas, the inhomogeneous polarization beams used by each SSB are different. That is, the transmitting uses different inhomogeneous polarization beams to transmit SSB 1 to SSB 4. When the receiving measures the signal strength for each SSB, the index of SSB 4 with the highest signal strength may be selected. Based on the polarization information measured at SSB 4, the receiving end may select an index for the polarization information from a pre-configured high-resolution polarization pattern matrix 4 ($P_{N-1, N-1}$ in FIG. 15). Further, the receiving end may select a beam index matrix 4 associated with the selected SSB 4 from among the pre-configured beam index matrices, and may select a beam index based on the index for the polarization information selected in the selected beam index matrix 4 ($N^2-N-1$ in FIG. 15). In other words, the receiving end may select the SSB index and the high-resolution polarization pattern matrix and beam index matrix associated therewith based on the signal strength, and may select the beam index within the selected beam index matrix based on the obtained polarization information.

a) When Beam Alignment is Performed at the Transmitting End:

The transmitting end transmits different inhomogeneous polarization beams at each SSB, the receiving end feeds back the measured signal strength and polarization information, and the transmitting end may perform beam alignment based on the feedback information.

The information fed back by the receiving end may be the measured signal strength and polarization information at SSB x (x=1 . . . , max(SSB index)). The receiving end may feedback the measured signal strength and polarization state information for each SSB to the transmitting via pre-configured physical resources (e.g., time/frequency) or physical channels (e.g., xPUSCH or xPUCCH).

The polarization state information may be polarization state information defined as a Stokes vector and/or a Poincare sphere angle vector. The signal strength and polarization state information may be quantized or indexed to be fed back. The amount of signal strength and polarization state information to be fed back may be pre-configured by the physical resources and/or physical channels over which the feedback information is transmitted.

b) Beam Alignment is Performed at the Receiving End:

The transmitting transmits different inhomogeneous polarization beams at each SSB. The receiving end may measure the signal strength and polarization information, and perform beam selection/alignment based on the information about the inhomogeneous polarization pattern pre-configured or received over the broadcast channel. The receiving end may feedback information about the selected beam to the transmitting end.

The information about the inhomogeneous polarization pattern may be pre-configured. The information about the inhomogeneous polarization pattern may be pre-configured at the design stage of the transmitting end and the receiving end.

Alternatively, the transmitting and the receiving end may exchange information about the inhomogeneous polarization pattern in advance. The information about the inhomogeneous polarization pattern may be exchanged in advance during the initial access phase or through periodic broadcasting. For example, the information about the inhomogeneous polarization pattern may be exchanged via a MIB transmitted over xPBCH. For example, information about inhomogeneous polarization patterns may be exchanged via SIBs transmitted over xPDSCH.

The information about the inhomogeneous polarization pattern may be quantized into a high-resolution polarization pattern matrix. Alternatively, the information about the inhomogeneous polarization pattern may be defined as information about a beam combination that produces the inhomogeneous polarization pattern. The information about the beam combination is the generation information of each beam used by the inhomogeneous polarization beam generator at the transmitting end. For example, for a particular element beam m, [m, $A_m$, $\theta_m$, $|P_m>$] may be pre-defined. Here, m is the LG beam order of the element beam, $A_m$ is the amplitude information of the element beam m, $\theta_m$ is the phase information of the element beam m, and $|P_m>$ is the polarization information of the element beam m.

Information about the inhomogeneous polarization pattern may be pre-defined by associating it with a beam index based on the signal strength. For example, the SSB index may be associated with an index of the inhomogeneous polarization pattern and/or an index of the high-resolution polarization pattern matrix and/or an index of the beam combination information that produces the inhomogeneous polarization pattern.

The receiving end may measure signal strength and polarization information for each SSB via pre-configured physical resources (e.g., time/frequency) for beam alignment. The receiving end may select an SSB index based on the measured signal strength for the inhomogeneous polarization beam of each SSB, and may select a high-resolution polarization pattern matrix index and a beam index matrix based on the SSB index. The relationship between the SSB index and the high-resolution polarization pattern matrix index and the beam index matrix may be pre-configured.

Further, the receiving end may match the polarization information measured for the inhomogeneous polarization beam of each SSB with the configured/received inhomogeneous polarization pattern to search for the beam direction from the transmitting end to the receiving end. Polarization matching may be performed on a high-resolution polarization pattern matrix selected based on SSB indexes.

The receiving end may select a center direction of the beam for data transmission based on the selected beam index and the direction corresponding to the matched polarization. The receiving end may determine a pre-configured beam index based on the selected center direction of the beam. The relationship between the beam index and the orientation of polarization states or a pattern of polarization states may be pre-configured.

That is, polarization matching for a high-resolution polarization pattern matrix selected based on the SSB index may indicate a beam index within a beam index matrix selected based on the SSB index. Since a plurality of inhomogeneous polarization patterns is used, a plurality of high-resolution polarization pattern matrices may correspond to a plurality of beam index matrices.

(3) Third Example: A Plurality of Overlapping Beams with a Single or Plurality of Inhomogeneous Polarization Patterns FIG. 16 shows an example in which a plurality of beams having a single or plurality of inhomogeneous polarization patterns is transmitted overlappingly and detected by a receiving end to which the first implementation of the present disclosure is applied.

Figure 16:
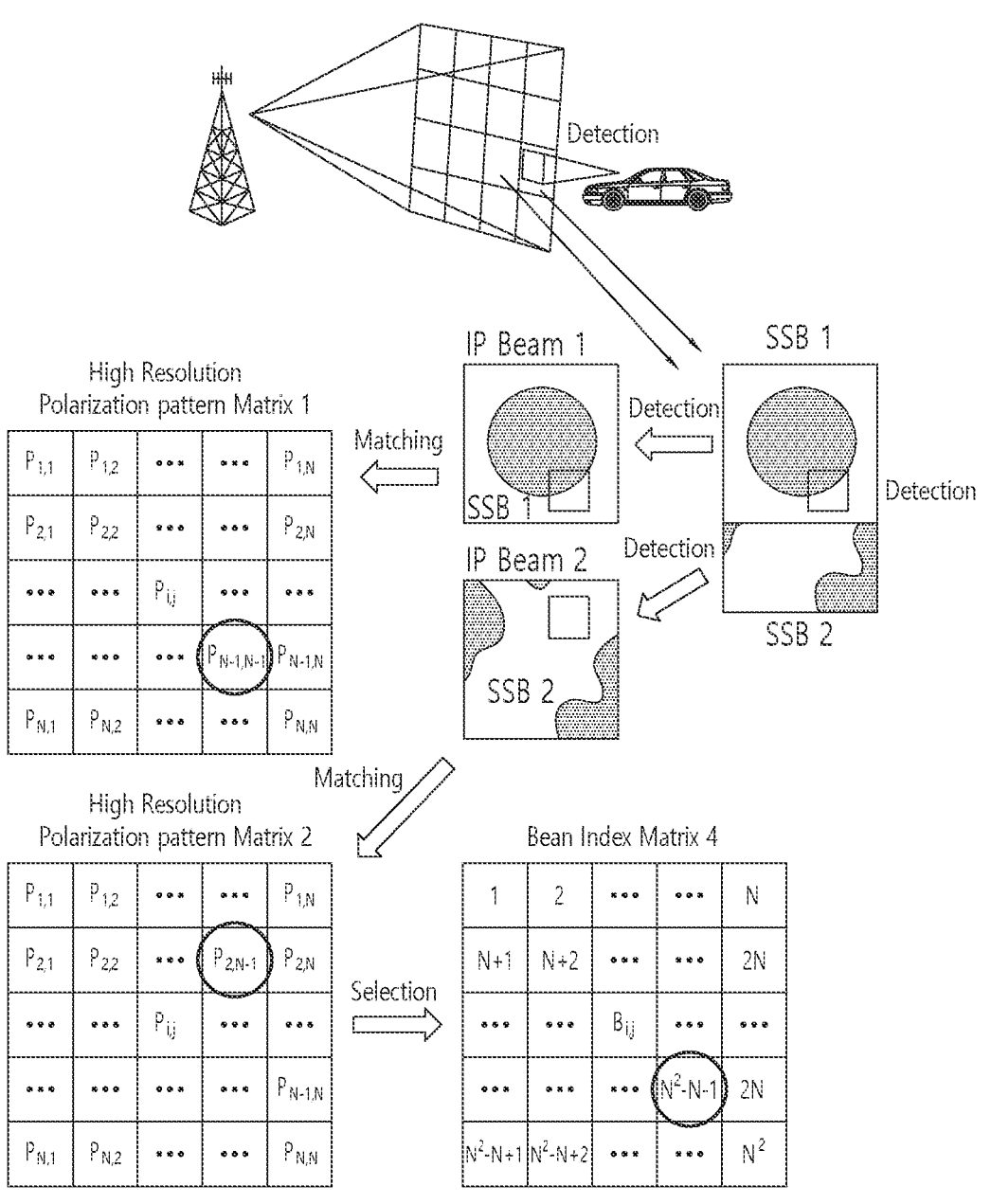
FIG. 16 shows an example in which a plurality of beams having a single or plurality of inhomogeneous polarization patterns is transmitted overlappingly and detected by a receiving end to which the first implementation of the present disclosure is applied.

Referring to FIG. 16, the transmitting end may transmit beams having a single or different inhomogeneous polarization patterns in four different regions (e.g., space) over four different physical resources (e.g., time/frequency). The receiving end may perform beam tracking in pre-assigned/configured physical resources for beam alignment. The operation of the transmitting/receiving end is similar to the second example described above in FIG. 15, except that the spatial regions utilized by each SSB may overlap.

The procedure for measuring a plurality of beams at the receiving end and feedback to the transmitting end is the same as the second example described above in FIG. 15, but the procedure for finally selecting a beam may be different as follows.

Case 1) Same as the Conventional Beam Selection Procedure

The receiving end may select the SSB index with the highest signal strength, select a high-resolution polarization pattern matrix and beam index matrix based on the selected SSB index, and select the beam index by polarization matching.

Case 2) Based on the Overlap Information of a Plurality of Beams, Perform Polarization Matching for Each Overlapping SSB Index, and Select a Beam by Synthesizing Each Polarization Information When the receiving end feedbacks signal strength information and polarization information for each SSB to the transmitting end, the transmitting end may perform polarization matching for each overlapping SSB index based on the feedbacked information and the overlap information of the SSBs, and select a beam by synthesizing each polarization information.

Alternatively, the transmitting end may exchange the overlap information with the receiving end, and the receiving end may perform polarization matching for the overlapping SSB indices based on the overlap information, and select the beam by synthesizing the respective polarization information.

The operation other than the procedure of exchanging the overlap information between the transmitting and receiving ends and finally selecting the beam may be the same as the second example described above in FIG. 15.

In the above description according to the first implementation of the present disclosure, a high-resolution polarization pattern matrix has been described primarily by way of example for ease of explanation. It will be appreciated that the high-resolution polarization pattern matrix described above is only one way of representing elemental information about the inhomogeneous polarization pattern, and may be represented as inhomogeneous polarization generation information, etc., rather than in the form of a pattern matrix.

In the above description according to the first implementation of the present disclosure, the application of the inhomogeneous polarization pattern to SSB transmission has been described by way of example for ease of explanation. However, it will be appreciated that this is only an example, and that the inhomogeneous polarization pattern may be applied to other reference signals, such as a Channel State Information Reference Signal (CSI-RS), a Sounding Reference Signal (SRS), and/or a Cell-pecific Reference Signal (C-RS). In particular, since the inhomogeneous polarization pattern uses all the polarizations on the Poincare sphere representing the polarization, the inhomogeneous polarization pattern may be applied as is for reference signals that do not utilize orthogonality with respect to polarization.

Applying the inhomogeneous polarization pattern to reference signals may be used not only during the initial access phase, but also to compensate for beam alignment in real time during connected states such as data transmission.

Applying the inhomogeneous polarization pattern to reference signals may include feeding back polarization information when performing feedback of measurement information for the reference signals, or feeding back updated beam index information at the receiving end.

Second Implementation: Inhomogeneous Polarization Based Coherent Transmitter/Receiver Structure According to the second implementation of the present disclosure, there is provided a structure of a transmitter for transmitting an In-phase/Quadrature (I/Q) signal capable of transmitting phase information as well as signal magnitude when forming a beam based on inhomogeneous polarization at the transmitting end. Further, according to the second implementation of the present disclosure, there is provided a structure of a coherent detection receiver capable of receiving magnitude and phase information of a signal while acquiring polarization information when receiving a beam based on inhomogeneous polarization at the receiving end.

The operation of the transmitting end and the receiving end according to the first implementation of the present disclosure described above may be performed by the transmitter and the receiver, respectively, according to the second implementation of the present disclosure described below.

(1) Transmitter Structure

Figure 17:
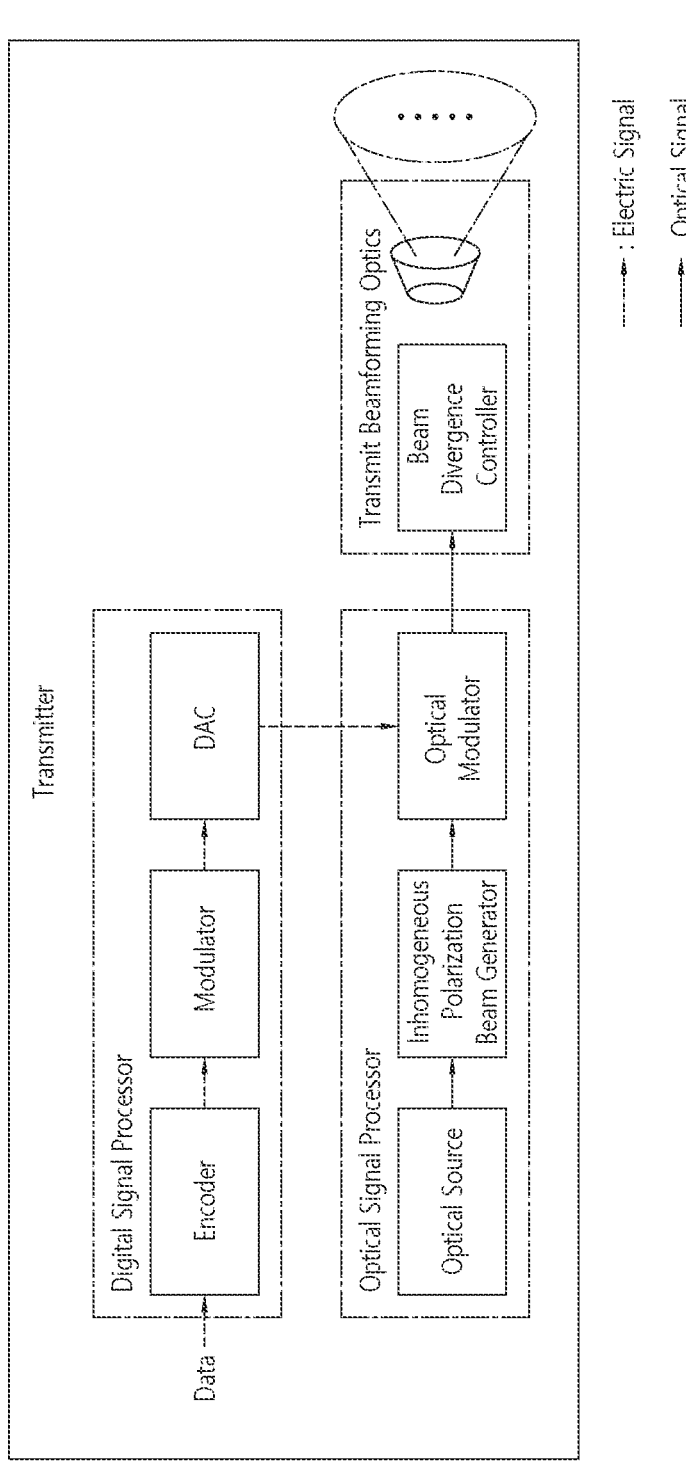
FIG. 17 shows an example structure of a transmitter to which the second implementation of the present disclosure is applied.

FIG. 17 shows an example structure of a transmitter to which the second implementation of the present disclosure is applied.

Referring to FIG. 17, a transmitter structure for transmitting an inhomogeneous polarization pattern comprises a digital signal processor for processing digital data, an optical signal processor for generating an inhomogeneous polarization pattern-based optical source, and transmit beamforming optics for beamforming the generated inhomogeneous polarization pattern-based signal.

a) Digital Signal Processor

The digital signal processor consists of an encoder to encode the data to be transmitted, a modulator to modulate the encoded data, and a Digital-to-Analog Converter (DAC) to convert the modulated digital signal to an analog signal. The converted analog signal is applied to an optical modulator in an optical signal processor.

The encoder is a module that encodes the bit stream, the digital data that the transmitter wants to transmit, such as a module that performs channel coding to ensure the reliability of the data against channel fading in RF communication systems. Various well-known channel coding techniques such as Reed-Solomon (RS). Turbo, Convolutional, Low-Density Parity Check (LDPC), and Polar Code may all be applied.

The modulator is a module that modulates the bit stream coded by the encoder into symbols. The modulator modulates in following ways: based on the intensity of the signal (e.g., Intensity Modulation/Direct Detection (IM/DD)) and based on the strength and phase of the signal (e.g., Coherent Transmission and Detection).

Intensity-based IM/DD schemes convert the information of the coded bit-stream into the intensity of the symbols. The IM/DD scheme may be categorized into: i) a single carrier scheme, which constellation map the coded bit stream into intensity only in the time domain, and ii) a multi carrier scheme, which constellation map the coded bit stream into intensity and phase in the time/frequency domain and then reconstruct it into intensity only in the time domain. The single carrier scheme includes On/Off Keying (OOK), Pulse Amplitude Modulation (PAM), Pulse Position Modulation (PPM), Pulse Width Modulation (PWM), etc. The multi carrier scheme includes DC biased Optical OFDM (DCO-OFDM), Asymmetrically Clipped Optical OFDM (ACO-OFDM), Asymmetrically clipped DC biased Optical OFDM (ADO-OFDM), and Pulse Amplitude Modulated Discrete Multi-tone Modulation (PAM-DMT), etc. Methods for mapping the constellation in terms of intensity and phase may be utilized, such as Quadrature Amplitude Modulation (QAM), which is utilized in conventional communication systems. In IM/DD scheme, no matter how the signal is modulated by the digital signal processor, it is multiplied with only the intensity information when mixed with the optical signal generated by the optical source.

The Coherent transmission and detection scheme based on intensity and phase convert the information of the coded bit-stream into the intensity and phase of the symbols. Methods such as QAM, which is utilized in conventional communication systems, may be utilized to map constellations with intensity and phase. Based on the constellation mapped symbol information, multi-carrier symbols are generated through multi-carrier schemes of existing communication systems, such as OFDM, Cyclic Prefix OFDM (CP-OFDM), Discrete Fourier Transform-Spread-OFDM (DFT-s OFDM), etc. In other words, in the coherent transmission and detection scheme, when the digital signal processor generates a symbol, in-phase and quadrature information are converted in the DAC, respectively, and the optical signal generated by the optical source is multiplied with both intensity and phase information.

The IM/DD scheme and the coherent transmission and detection scheme described above have different modulator operations and different characteristics depending on the configuration of the mobile OWC. In general, the IM/DD scheme may simplify the transmitting and receiving devices, although it may cause a loss of Signal Estimation (SE) and/or a loss of Signal-to-Noise Ratio (SNR) in terms of received data. On the other hand, the coherent transmission and detection scheme borrows the existing multi-carrier system, so it may realize the existing performance trend without any loss of SE or SNR, but it requires the use of additional modules or increases the complexity of the modules from the perspective of the transmitting and receiving devices. Therefore, it may be necessary to select or adaptively utilize a suitable transmit/receive method for the mobile OWC configuration.

The DAC converts the electrical symbols modulated by the modulator into analog signals. The DAC may convert digital signals into analog signals by up-sampling and pulse shaping. The converted analog signal is multiplied by the optical signal in the optical modulator of an inhomogeneous polarization beam generator.

b) Optical Signal Processor

The optical signal processor comprises an optical source that generates an optical signal, an inhomogeneous polarization beam generator that converts the signal generated by the optical source into an inhomogeneous polarization pattern and applies an analog signal that is applied from the digital signal processor. The generated inhomogeneous polarization-based optically modulated signal is applied to the transmission beamforming optics and transmitted toward the receiver.

The optical source generates an optical signal corresponding to the Infra-Red (IR) band used by the mobile OWC, and may comprise a Laser Diode (LD) or a Light Emitting Diode (LED).

Figure 18:
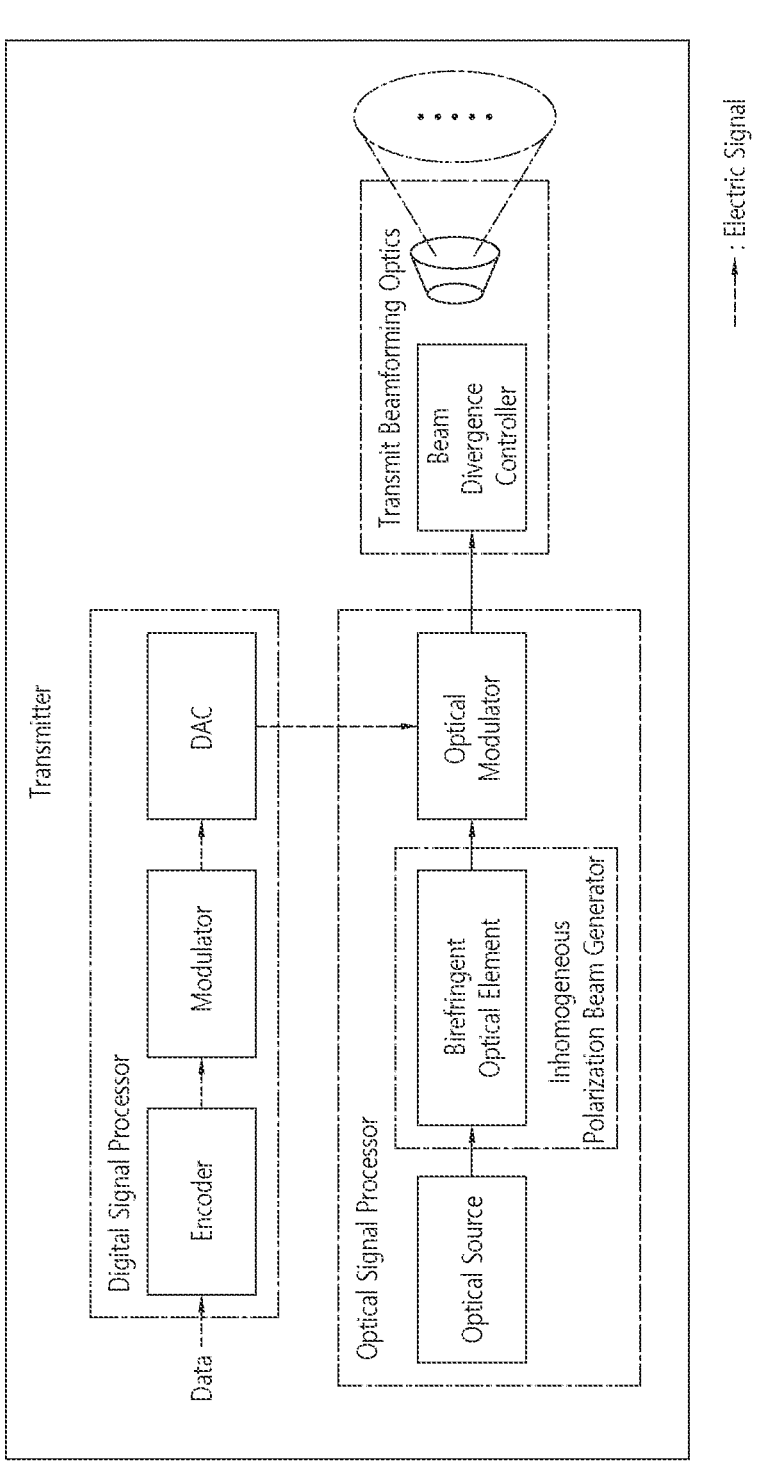
FIG. 18 shows an example of an inhomogeneous polarization beam generator to which the second implementation of the present disclosure is applied.

FIG. 18 shows an example of an inhomogeneous polarization beam generator to which the second implementation of the present disclosure is applied.

FIG. 18 shows a case where the inhomogeneous polarization beam generator of FIG. 17 is a birefringent optical element-based inhomogeneous polarization beam generator.

The birefringent optical element is a combination of birefringent elements with different fast axes, such as a Spatially variant Half Waveplate (SHWP), Spatially Varying Retarder (SVR), or Four-Quadrant quarter Waveplate (FQWP), that passes a homogenous polarization beam generated by the optical source and outputs an inhomogeneous polarization beam. Alternatively, the birefringent optical element may generate an inhomogeneous polarization beam through a Graded Index (GRIN) lens, which is an optical element to address modal dispersion. The birefringent optical element may be configured in a variety of ways depending on the combination of detailed optical elements, and the output inhomogeneous polarization pattern may vary depending on the configuration of the elements. The inhomogeneous polarization beam generated by the birefringent optical element is mixed in the optical modulator with the analog signal output from the DAC and transmitted.

Figure 19:
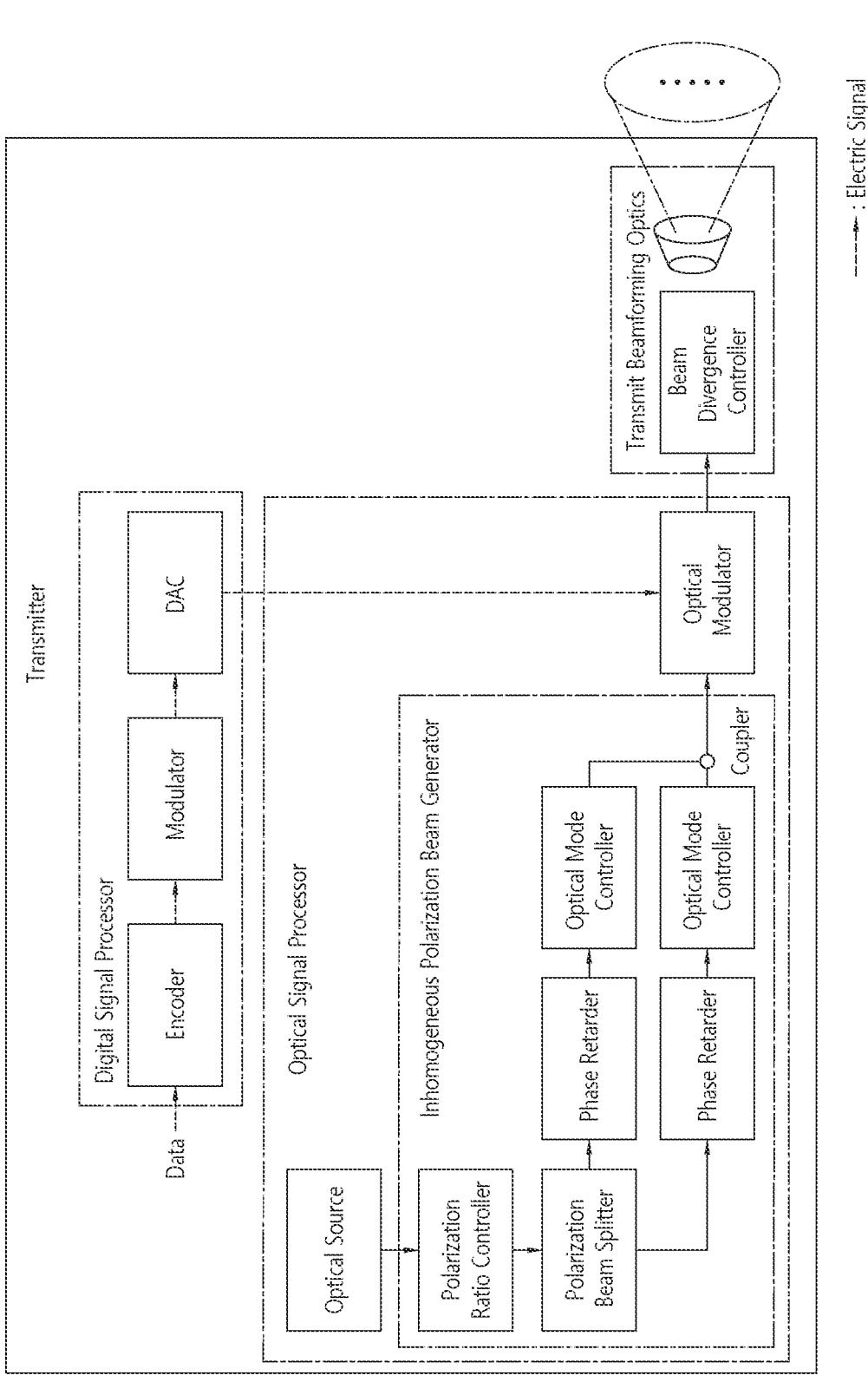
FIG. 19 shows another example of an inhomogeneous polarization beam generator to which the second implementation of the present disclosure is applied.

FIG. 19 shows another example of an inhomogeneous polarization beam generator to which the second implementation of the present disclosure is applied.

FIG. 19 shows a case where the inhomogeneous polarization beam generator of FIG. 17 is a polarization superposition-based inhomogeneous polarization beam generator.

Referring to FIG. 19, the polarization superposition-based inhomogeneous polarization beam generator comprises a polarization ratio controller, a polarization beam splitter, a phase retarder, an optical mode controller, and a coupler.

The polarization ratio controller may comprise a polarizer and a half-wave plate. The polarization ratio controller is used to convert an unpolarized beam or a polarized beam generated by the optical source into a linear polarization direction. Depending on the direction of the controlled linear polarization, the ratio of horizontal to vertical polarization is determined.

The polarization beam splitter is an optical device that splits the horizontal and vertical polarization, and splits the horizontal and vertical polarization components of the linear polarization input from the polarization ratio controller.

The phase retarder is a device that converts the polarization of an incident beam, and may consist of a half-wave plate or a quarter-wave plate. Each horizontal and vertical polarization branched from the polarization beam splitter is converted to the intended polarization by the phase retarder.

The optical mode controller may comprise an optical amplifier, a phase controller, a spatial light modulator, a spiral phase plate, a phase shift hologram, a metasurface, etc. The optical amplifier may control the optical amplitude of each branched beam. The phase controller may control the initial phase of each branched beam. The spatial light modulator, spiral phase plate, phase shift hologram, metasurface, etc., may control the LG beam order or HG beam order, which is the mode of each branched beam.

The coupler is an optical device that re-nest each branched, converted beam.

The inhomogeneous polarization beam from the optical superposition is mixed in the optical modulator with the analog signal output from the DAC and transmitted.

An example of the operation of the optical superposition-based inhomogeneous polarization beam generator is as follows.

The unpolanzed beam generated by the optical source is converted to a +45-degree linear polarization in the polarization ratio controller.

The +45-degree linear polarization has the same ratio of vertical to horizontal polarization, so the vertical polarization and horizontal polarization are split in equal proportions in each path in the polarization beam splitter.

If the phase retarder in the vertical polarization path is a QWP, the vertical polarization is converted to RCP, and if the phase retarder in the horizontal polarization path is a QWP, the horizontal polarization is converted to LCP.

If the optical modulator in the RCP path has an LG beam order of m, the output beam will be $LG_m|RCP>$. Similarly, if the optical modulator in the LCP path has an LG beam order of n, the output beam will be $LG_n|LCP>$. Here, $LG_m$ or $LG_n$ means that the signal has LG beam order m or n.

The two beams are superimposed at the coupler to form a superimposed beam, which is an inhomogeneous polarization beam.

If the optical modulator in each path has an optical amplifier and an optical phase shifter, the amplitude and phase are controlled in each path. Letting the controlled amplitude and phase in each path be $A_m$, $A_n$ and $\theta_m$, On, respectively, the output superposition signal may be expressed as shown in Equation 15.

$$A_m e^{-j\theta_m} LG_m \left| RCP \right\rangle + A_n e^{-j\theta_n} LG_n \left| LCP \right\rangle = A_c e^{-j\theta_c} \left| P_c \right\rangle \quad \text{[Equation 15]}$$

In the description of FIG. 19, some elements may be replaced by a single element that performs two or more of the same functions.

In FIG. 19, it is shown that two beams are superimposed for ease of description, but this is by way of example only. The polarization superposition-based inhomogeneous polarization beam generator described in FIG. 19 according to the second implementation of the present disclosure is also applicable when a greater number of beams than two are superimposed. In this case, the plurality of beams may be further superimposed by repeating the method described in FIG. 19.

Referring back to FIG. 17, the optical modulator performs optical modulation based on the inhomogeneous polarization beam generated by the optical source and the inhomogeneous polarization beam generator and an analog signal received from the digital signal processor. The optical modulation may be configured differently depending on the transmission and reception scheme, IM/DD or coherent transmission and detection.

For the IM/DD scheme, the optical modulator may use a Mach-Zehnder Modulator (MZZM), Electro-Absorption Modulator (EAM), etc. The MZM is a device that consists of two phase modulators in parallel, bifurcates the incoming optical signal into two paths, and combines the outputs after the operation of the phase modulator in each path. The operation of each phase modulator is driven by an analog signal applied from the digital signal processor. The MZM is an intensity modulator that utilizes the phenomenon that when two phase modulators are in the same phase, the intensity is maintained and only the phase changes by constructive interference, and when the phase difference is n, the intensity disappears by destructive interference.

An EAM is a semiconductor device that controls the intensity of an optical signal based on voltage, which is driven by the Franz-Keldysh effect, which changes the degree of absorption of photons in a semiconductor when an electric field is applied. EAMs are easy to integrate as semiconductor devices, but their output optical power is about 3 dBm, so the optical amplifier is required.

The optical modulator determines the phase shift value based on the wavelength, electrode length, and effective refractive index. The effective refractive index has a linear relationship with the external control voltage, u(t), and as the external voltage changes, the effective refractive index changes, which in turn changes the phase. If the external control voltage that creates a phase shift of $\pi$ is $V_\pi$, the transfer function of the optical modulator may be expressed as Equation 16.

$$E_{out}(t) = E_{in}(t) \cdot e^{j\frac{u(t)}{V_\pi}\pi} \quad \text{[Equation 16]}$$

Similarly, the transfer function of an MZM consisting of two phase modulators may be expressed as Equation 17.

$$E_{out}(t) = E_{in}(t) \cdot \frac{1}{2} \cdot \left( e^{j\frac{u1(t)}{V_{\pi1}}\pi} + e^{j\frac{u2(t)}{V_{\pi2}}\pi} \right) \quad \text{[Equation 17]}$$

For the coherent transmission and detection scheme, the optical modulator may use an IQ modulator. The IQ modulator may be constructed by configuring two MZM modules in parallel and inserting a phase shifter corresponding to $\pi/2$ in one path. Each path is used to modulate an in-phase signal and a quadrature signal, respectively, allowing both intensity and phase to be modulated.

The optical IQ modulator performs in-phase modulation by a control voltage $u_I(t)$ on the in-phase signal and quadrature modulation by a control voltage $u_Q(t)$ on the quadrature signal, which are then synthesized to produce an IQ-modulated signal. The transfer function of optical IQ modulation may be expressed as Equation 18.

$$E_{out}(t) = E_{in}(t) \cdot \frac{1}{2} \cdot \left( \cos\left(\frac{u_I(t)}{V_\pi}\frac{\pi}{2}\right) + j\,\cos\left(\frac{u_Q(t)}{V_\pi}\frac{\pi}{2}\right) \right) \quad \text{[Equation 18]}$$

Figure 20:
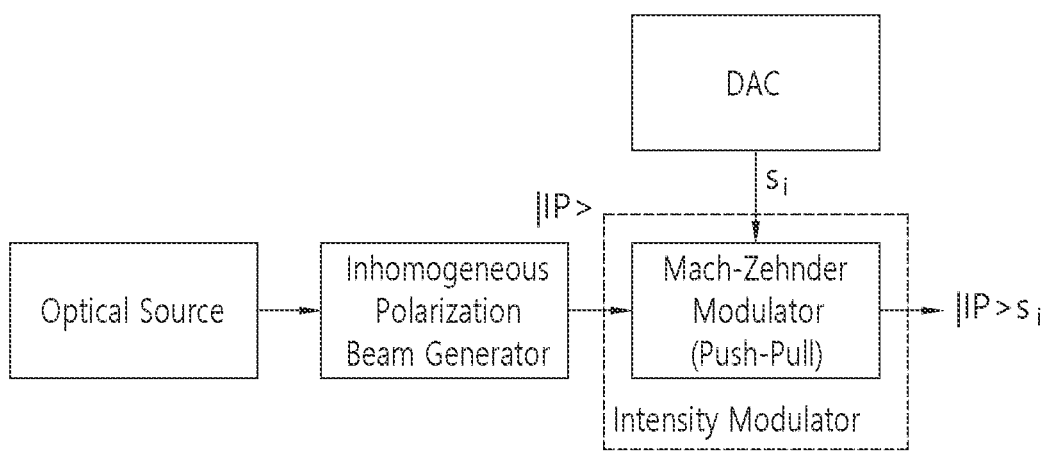
FIG. 20 shows an example of an intensity modulator used for an IM/DD scheme combined with an inhomogeneous polarization beam generator to which the second implementation of the present disclosure is applied.

FIG. 20 shows an example of an intensity modulator used for an IM/DD scheme combined with an inhomogeneous polarization beam generator to which the second implementation of the present disclosure is applied.

Referring to FIG. 20, the inhomogeneous polarization beam generated by the inhomogeneous polarization beam generator is represented by $E_{in}(t)=|IP\rangle$. For the intensity modulator configuration, the MZM is configured in a push-pull scheme. The push-pull scheme refers to the case where $V_{\pi 1}=V_{\pi 2}=V_\pi$, and $u1(t)=-u2(t)=u(t)$, when the transfer function of the MZM is equal to Equation 17 described above. Therefore, if $u(t)=V_{bias}+s_i(t)$, the transfer function may be expressed as Equation 19.

$$E_{out}(t) = |IP\rangle\cos\frac{V_{bias} + s_i(t)}{V_\pi}\pi \qquad \text{[Equation 19]}$$

Since the cosine term in Equation 19 increases as $s_i(t)$ increases, a simplified expression of Equation 19 may be given by Equation 20.

$$E_{out}(t) = |IP\rangle s_i \qquad \text{[Equation 20]}$$

In other words, it is a beam pattern formed by an inhomogeneous polanzation beam $|IP\rangle=A_c e^{-j\theta c}|P_c\rangle$, and the characteristics of the inhomogeneous polarization beam pattern may be maintained even when the transmit strength signal $s_i$ is applied. Thus, by combining the intensity modulator and the inhomogeneous polarization beam generator according to the description of FIG. 20, the intensity signal may be transmitted via the inhomogeneous polarization beam.

Figure 21:
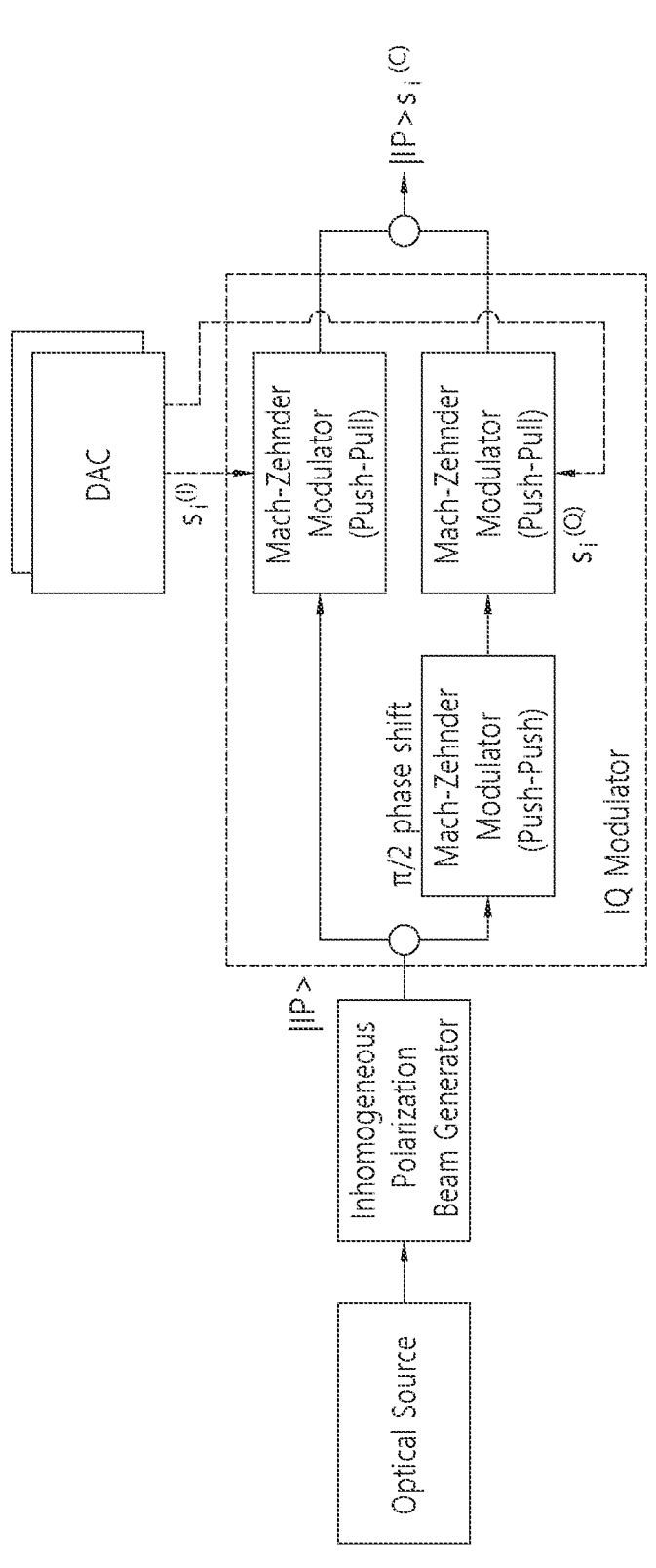
FIG. 21 shows an example of an IQ modulator used for a coherent transmission and detection scheme combined with an inhomogeneous polarization beam generator to which the second implementation of the present disclosure is applied.

FIG. 21 shows an example of an IQ modulator used for a coherent transmission and detection scheme combined with an inhomogeneous polarization beam generator to which the second implementation of the present disclosure is applied.

Referring to FIG. 21, the inhomogeneous polarization beam generated by the inhomogeneous polarization beam generator is represented by $E_{in}(t)=|IP\rangle$. For the IQ modulator configuration, one MZM is configured in a push-push scheme and two MZMs are configured in a push-pull scheme. The push-push scheme refers to the case where $V_{\pi 1}=V_{\pi 2}=V_\pi$ and $u1(t)=u2(t)=u(t)$ when the transfer function of the MZM is equal to Equation 17 described above. Therefore, in the IQ modulator, the push-push scheme MZM may perform a phase shift corresponding to $\pi/2$ to construct the imaginary part of the quadrature element. Assuming that the complex signal $s_i(C)$ generated by the modulator is applied to the DAC and divided into an in-phase signal $s_i^{(I)}$ and a quadrature signal $s_i^{(Q)}$ and applied to the IQ modulator, the transfer function of the entire IQ modulator may be expressed as Equation 21.

$$E_{out}(t) = E_{in}(t)\cdot\frac{1}{2}\cdot\left(\cos\left(\frac{u_I(t)}{V_\pi}\frac{\pi}{2}\right) + j\,\cos\left(\frac{u_Q(t)}{V_\pi}\frac{\pi}{2}\right)\right) \qquad \text{[Equation 21]}$$

If $u_I(t)=V_{bias}+s_i^{(I)}(t)$ and $u_Q(t)=V_{bias}+s_i^{(Q)}(t)$ in Equation 21, the transfer function may be expressed as Equation 22.

$$E_{out}(t) = \frac{1}{2}|IP\rangle \qquad \text{[Equation 22]}$$

-continued
$$\left(\cos\left(\frac{V_{bias} + s_i^{(I)}(t)}{V_\pi}\frac{\pi}{2}\right) + j\,\cos\left(\frac{V_{bias} + s_i^{(Q)}(t)}{V_\pi}\frac{\pi}{2}\right)\right)$$

Since the cosine term in Equation 22 increases as $s_i^{(I)}(t)$ and $s_i^{(Q)}(t)$ increase, a simplified expression of Equation 22 may be given by Equation 23.

$$E_{out}(t) = \frac{1}{2}|IP\rangle(s_i^{(I)} + js_i^{(Q)}) = |IP\rangle s_i^{(C)} \qquad \text{[Equation 23]}$$

In other words, it is a beam pattern formed by an inhomogeneous polarization beam $|IP\rangle=A_c e^{-j\theta c}Pc\rangle$, and the characteristics of the inhomogeneous polarization beam pattern may be maintained even when the transmitted complex signal $s_i^{(C)}$ is applied. Thus, by combining the IQ modulator and an inhomogeneous polarization beam generator as described in FIG. 21, a complex signal may be transmitted via an inhomogeneous polarization beam.

c) Transmit Beamforming Optics

Referring back to FIG. 17, the transmit beamforming optics may comprise an array antenna, collimator, lens, metasurface, etc., and transmits and beamforms an optically modulated signal received from the optical signal processor toward the receiving end. Depending on its configuration, the transmit beamforming optics may comprise a single element (e.g., an array antenna or lens) or various combinations of multiple elements (e.g., a single antenna+lens, lens+metasurface, etc.).

The transmission beamforming optics may include a beam divergence controller. The beam divergence controller may control the divergence of the target beam. That is, the inhomogeneous polarization pattern described above may be magnified to the size of the target beam by the beam divergence controller and transmitted.

(2) Receiver Structure

Figure 22:
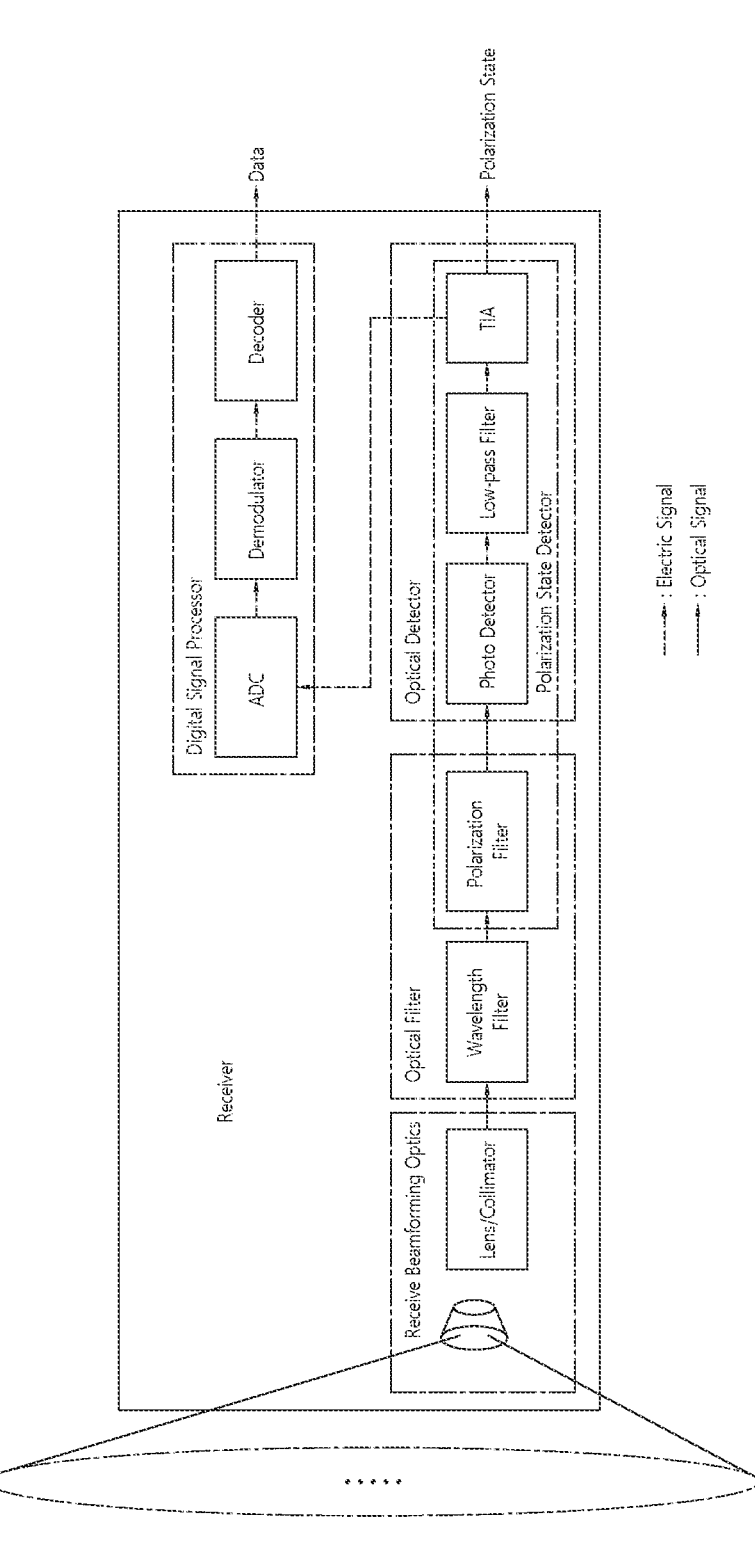
FIG. 22 shows an example structure of a receiver to which the second implementation of the present disclosure is applied.

FIG. 22 shows an example structure of a receiver to which the second implementation of the present disclosure is applied.

Referring to FIG. 22, a receiver structure for receiving an inhomogeneous polarization pattern comprises receive beamforming optics for receiving through a receiver aperture, an optical filter for detecting the polarization pattern, an optical detector for converting the optical signal to an electrical signal, and a digital signal processor for electrical demodulation.

a) Receive Beamforming Optics

The receive beamforming optics beamforms the target signal received from the receiver aperture, such as an array antenna, collimator, lens, metasurface, etc. Depending on its configuration, the receive beamforming optics may comprise a single element (e.g., an array antenna or lens) or various combinations of a plurality of elements (e.g., a single antenna+lens, lens+metasurface, etc.). The receive beamforming optics focus the incident light signal through the lens onto an optical fiber. The focused beam is then directed to the optical filter.

b) Optical Filter

The optical filter may consist of a wavelength filter, a coupler, and a polarization filter.

The polarization filter is an optical filter device for passing only the desired signal among the received signals, which functions as a bandpass filter.

The polarization state detector may comprise the polarization filter of the optical filter and a Photo Detector (PD) of the optical detector. Through the polarization state detector, polarization state information may be acquired. The configuration of the polarization state detector may vary depending on the configuration and type of the polarization filter and the photo detector.

Figure 23:
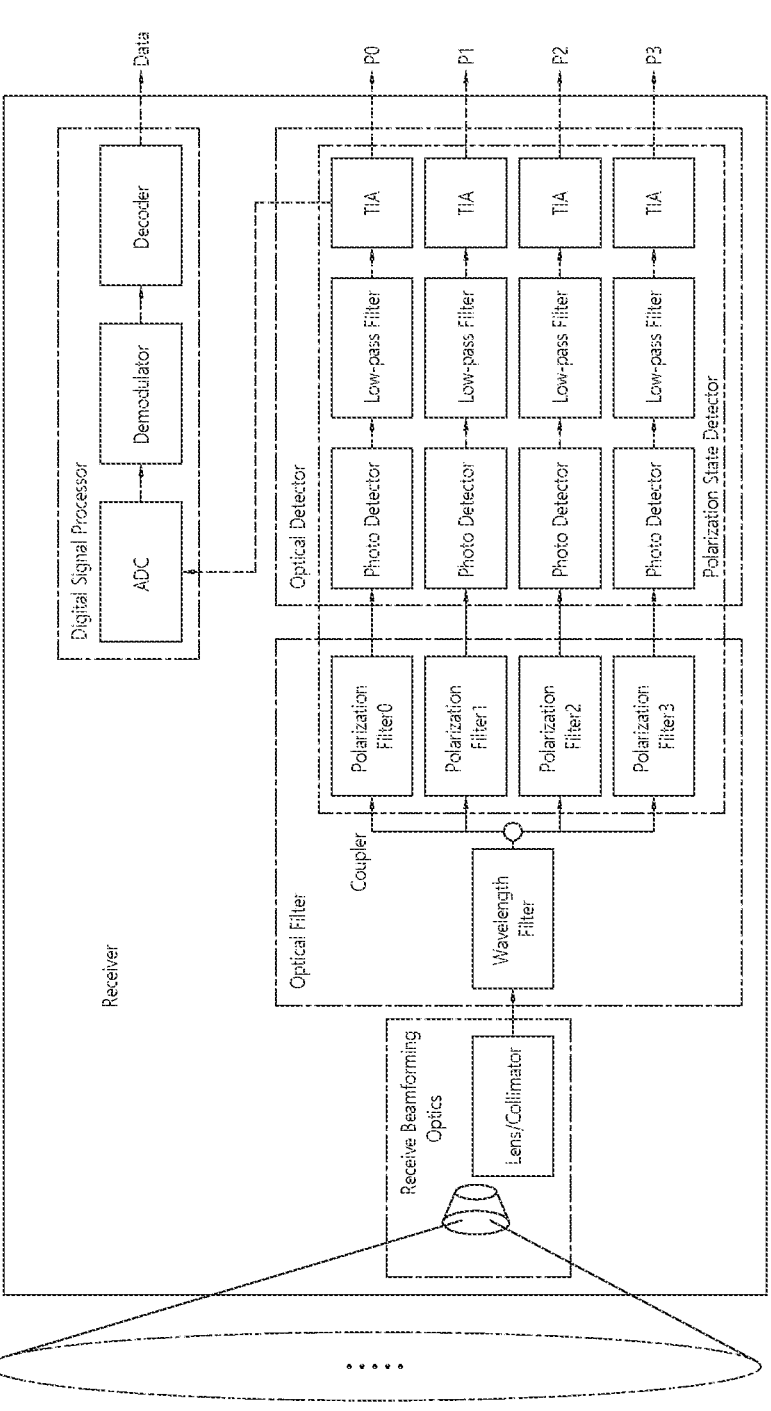
FIG. 23 shows an example of a polarization state detector for measuring a Stokes parameter to which the second implementation of the present disclosure is applied.

FIG. 23 shows an example of a polarization state detector for measuring a Stokes parameter to which the second implementation of the present disclosure is applied.

Referring to FIG. 23, a desired signal after passing through the wavelength filter is bifurcated into four signals at the coupler. FIG. 23 assumes that the four branched signals have the same ratio, but the ratio may vary depending on the purpose. Each branched path may pass the signal through a different polarization filter. For example, polarization filter 0 may be a horizontal polarizer, polarization filter 1 may be a vertical polarizer, polarization filter 2 may be a +45 degree linear polarizer, and polarization filter 3 may consist of a series connection of a QWP and a +45 degree polarizer. In addition, an optical amplifier to improve the quality of the received signal and/or an adaptation filter to compensate for channel effects may additionally be used in the optical filter.

c) Optical Detector

Referring back to FIG. 22, the intensity of the signal that has passed through each polarization filter in the optical filter is measured at the optical detector. In the optical detector, the intensity of the optical signal is converted to a photocurrent in the photodetector or photodiode, which is converted to a voltage through the low-pass filter and a Transimpedance Amplifier (TIA).

Figure 24:
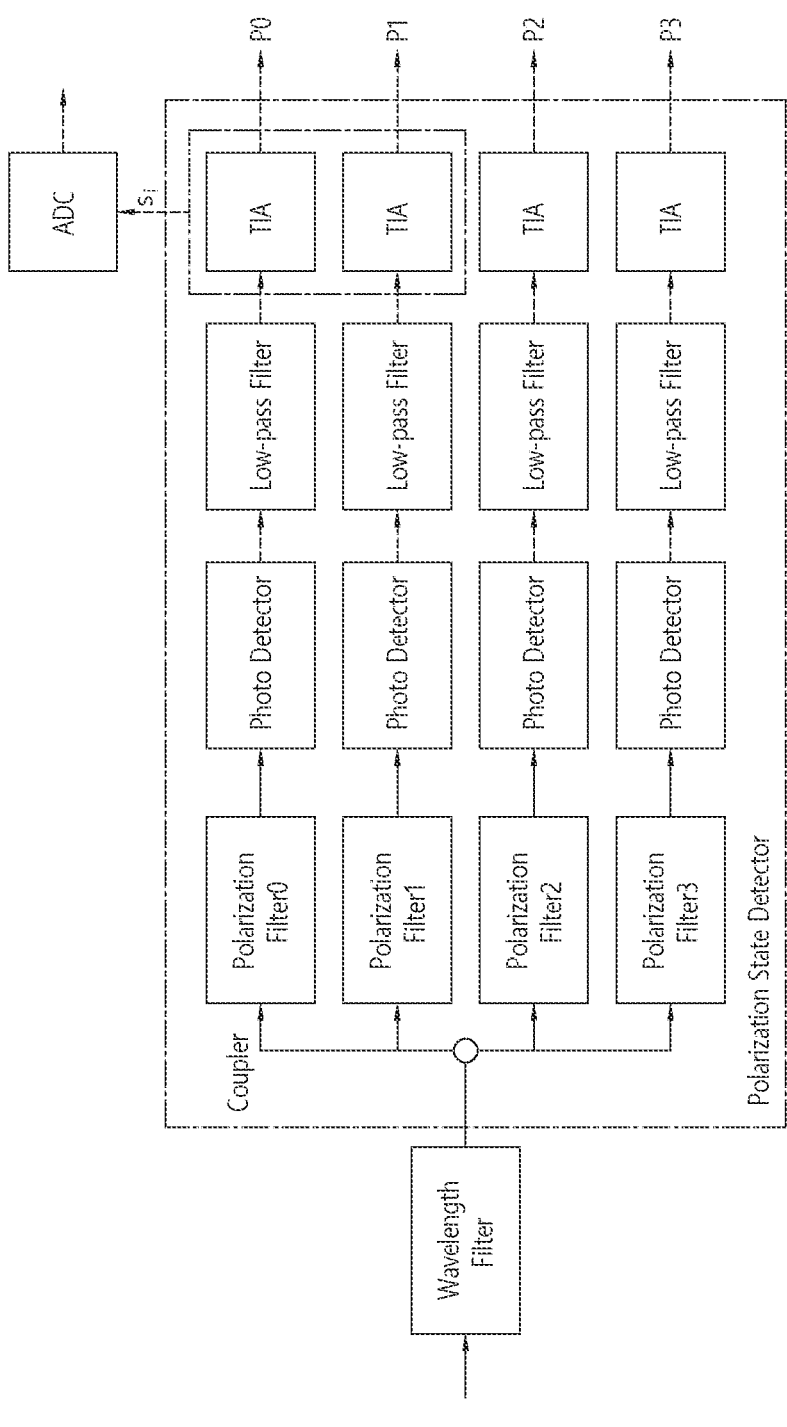
FIG. 24 shows an example of a structure for detecting intensity-modulated signals and polarization in a polarization state detector to which the second implementation of the present disclosure is applied.

FIG. 24 shows an example of a structure for detecting intensity-modulated signals and polarization in a polarization state detector to which the second implementation of the present disclosure is applied.

Referring to FIG. 24, the power measured at the optical detector in each path is $P_0$ through $P_3$, four in total, of which $P_0$ and $P_1$ are combined and fed into the ADC of the digital signal processor. Depending on the characteristics of each polarizer passed through, $P_0$ to $P_3$ may be expressed as Equation 24.

$$P_0 = |E_x|^2 \qquad \text{[Equation 24]}$$

$$P_1 = |E_y|^2$$

$$P_2 = \frac{1}{2}\left(E_x^2 + E_y^2 + 2E_x E_y \cos \delta\right)$$

$$P_3 = \frac{1}{2}\left(E_x^2 + E_y^2 + 2E_x E_y \sin \delta\right)$$

Thus, from the output power of Equation 24, the Stokes parameter may be obtained as shown in Equation 25.

$$S_0 = P_0 + P_1 \qquad \text{[Equation 25]}$$

$$S_1 = P_0 - P_1$$

$$S_2 = 2P_2 - P_0 - P_1$$

$$S_3 = 2P_3 - P_0 - P_1$$

From the obtained Stokes parameter, the polarization state may be obtained.

Since the components for the intensity signal transmitted by an inhomogeneous polarization beam are common for the x-axis component and the y-axis component that make up the polarization, they may be expressed as $|s_i|^2 = E_s E_s^*$, where $E_s$ is the received signal converted to an amplitude signal by the PD and TIA, and $E_s^*$ is the complex conjugate of $E_s$. Since the signal has been evenly split at the coupler, $E_x$ and $E_y$ to reconstruct $E_s$ are equal to $\frac{1}{2}$ in terms of power, which may be expressed as $|s_i|^2 = 2|E_x|^2 + 2|E_y|^2$. Thus, the power $|s_i|^2 = 2(P_0 + P_1)$ of the intensity signal may be obtained from the above output power.

Figure 25:
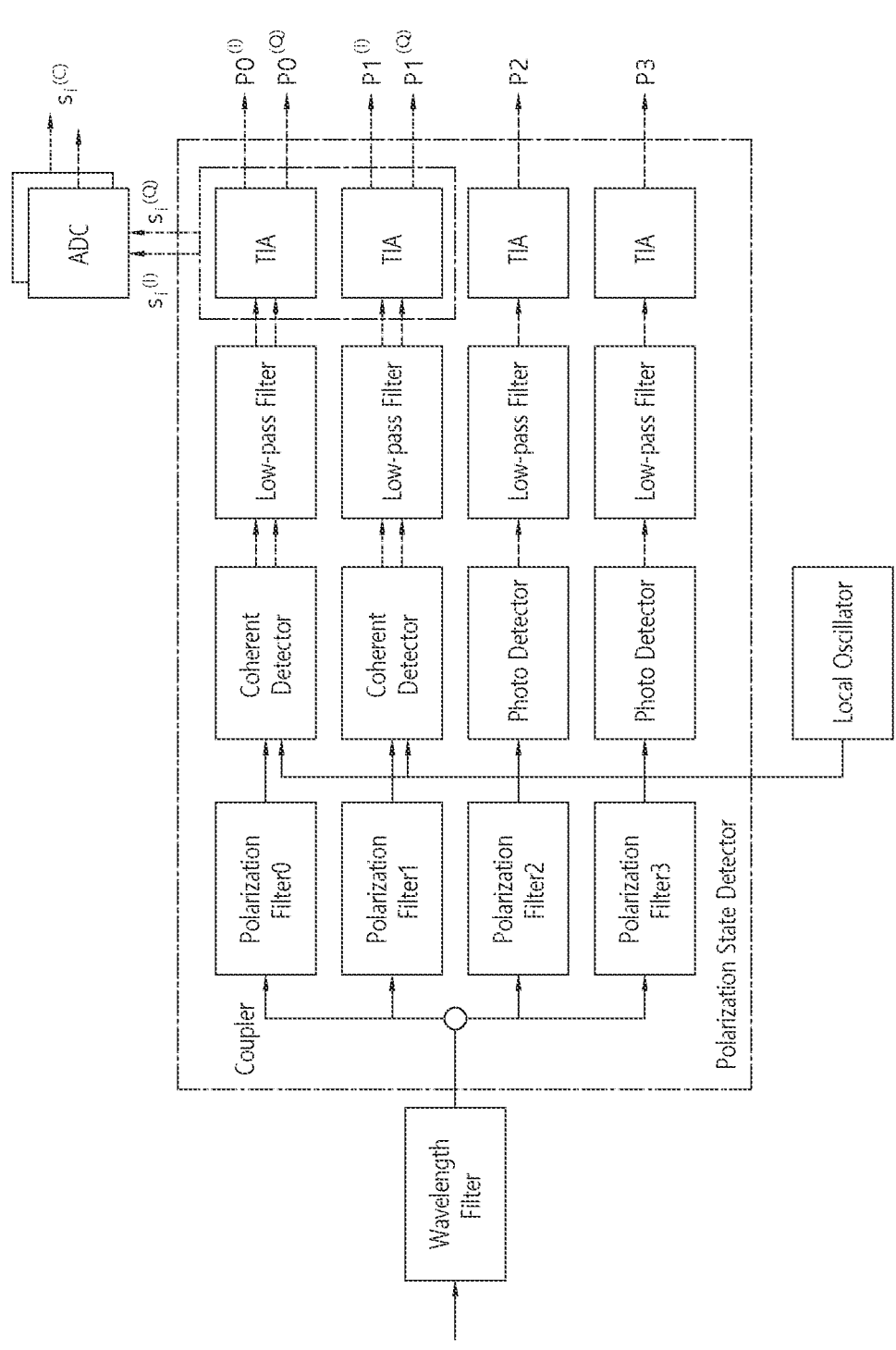
FIG. 25 shows an example of a structure for detecting a complex signal and polarization in a polarization state detector to which the second implementation of the present disclosure is applied.

FIG. 25 shows an example of a structure for detecting a complex signal and polarization in a polarization state detector to which the second implementation of the present disclosure is applied.

Referring to FIG. 25, the coherent detector and local oscillator may be configured via a 90-degree hybrid and a balanced PD.

Figure 26:
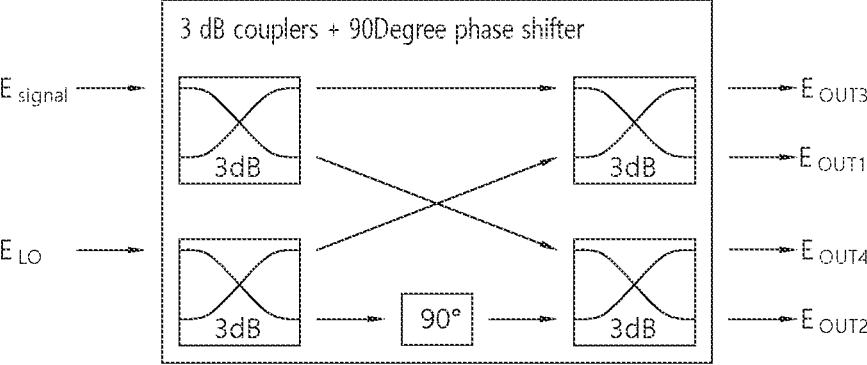
FIG. 26 shows an example of a coherent detector to which the second implementation of the present disclosure is applied.

FIG. 26 shows an example of a coherent detector to which the second implementation of the present disclosure is applied.

Referring to FIG. 26, one coherent detector has two outputs each from two balanced PDs. Correspondingly, each path consisting of a low-pass filter and a TIA also consists of two, although in FIG. 26, they are only represented by lines for ease of description.

The IQ modulation for coherent detection is implemented as a 90-degree hybrid, mixing the received modulated carrier and the output of the local oscillator through a 3 dB coupler and a 90-degree phase shifter. In a 90-degree hybrid, the received signal may be represented by Equation 26.

$$E_s(t) = \sqrt{P_s}\, e^{j(\omega_s t + \varphi_s)} \cdot a(t) \cdot e^{j\varphi(t)} \cdot e^{j\varphi_{n_s}(t)} \qquad \text{[Equation 26]}$$

In Equation 26, $P_s$, $w_s$, $\varphi_s$ are the power, frequency, and phase of the received signal, $a(t)$, $\varphi(t)$ are the amplitude and phase of the phase-modulated signal (e.g., QAM signal), and $\varphi_{ns}(t)$ is the phase noise from the Tx laser.

The output signal of the local oscillator may be expressed as Equation 27.

$$E_{LO}(t) = \sqrt{P_{LO}}\, e^{j(\omega_{LO} t + \varphi_{LO})} \cdot e^{j\varphi_{nLO}(t)} \qquad \text{[Equation 27]}$$

In Equation 27, $P_{LO}$, $w_{LO}$, and $\varphi_{LO}$ are the power, frequency, and phase of the output signal of the local oscillator, and $\varphi_{nLO}(t)$ is the phase noise from the local oscillator laser.

Then, the output of the 90-degree hybrid may be composed of four signals as shown in Equation 28.

$$\begin{bmatrix} E_{out_1}(t) \\ E_{out_2}(t) \\ E_{out_3}(t) \\ E_{out_4}(t) \end{bmatrix} = \frac{1}{2} \cdot \begin{bmatrix} E_s(t) + E_{LO}(t) \\ E_s(t) + jE_{LO}(t) \\ E_s(t) - E_{LO}(t) \\ E_s(t) - jE_{LO}(t) \end{bmatrix} \qquad \text{[Equation 28]}$$

Figure 27:
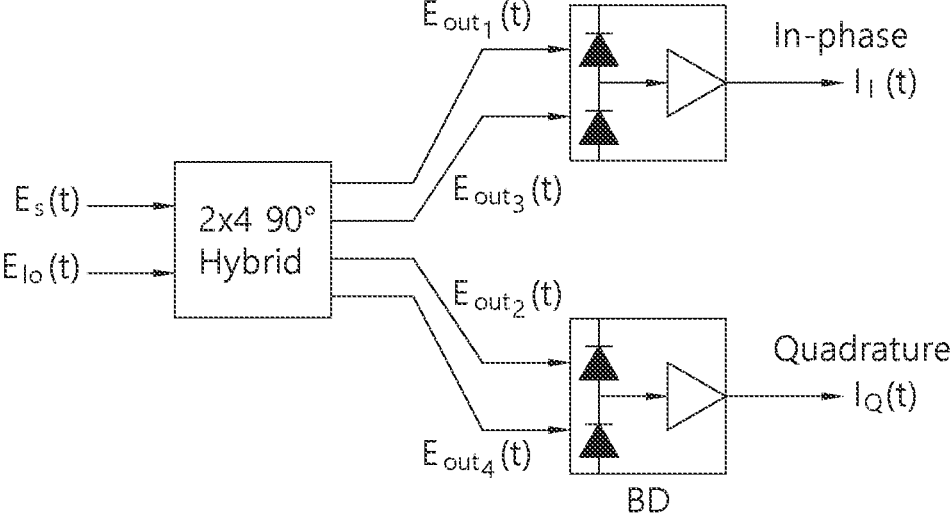
FIG. 27 shows another example of a coherent detector to which the second implementation of the present disclosure is applied.

FIG. 27 shows another example of a coherent detector to which the second implementation of the present disclosure is applied.

Referring to FIG. 27, the four signals according to Equation 28 are divided into $E_{out1}(t)$, $E_{out3}(t)$, $E_{out2}(t)$, and $E_{out4}(t)$ and are applied to two balanced PDs.

Then, the photocurrent for the in-phase may be expressed as Equation 29.

$$I_I(t) = R\sqrt{P_S P_{LO}} \cdot a(t) \cdot \cos(\omega_{IF} t + \varphi(t) + \varphi_n(t))$$ [Equation 29]

In Equation 29, R is the responsivity of each PD, $w_{IF}$ is the intermediate frequency corresponding to the difference between the received signal and the carrier frequency of the local oscillator, and $\varphi_n(t)$ is the residual phase noise component.

In the same way, the photocurrent for the quadrature may be expressed as Equation 30.

$$I_Q(t) = R\sqrt{P_S P_{LO}} \cdot a(t) \cdot \sin(\omega_{IF} t + \varphi(t) + \varphi_n(t))$$ [Equation 30]

Thus, the complex signal may be reconstructed from the in-phase and quadrature elements.

Figure 28:
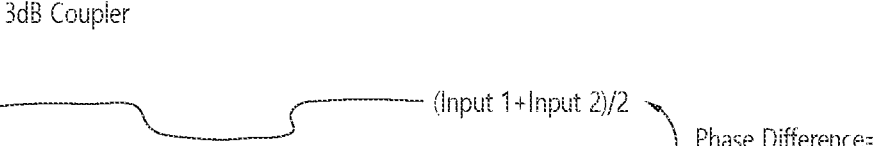
FIG. 28 shows an example of a 3 dB coupler and a balanced PD to which the second implementation of the present disclosure is applied.
Figure 28:
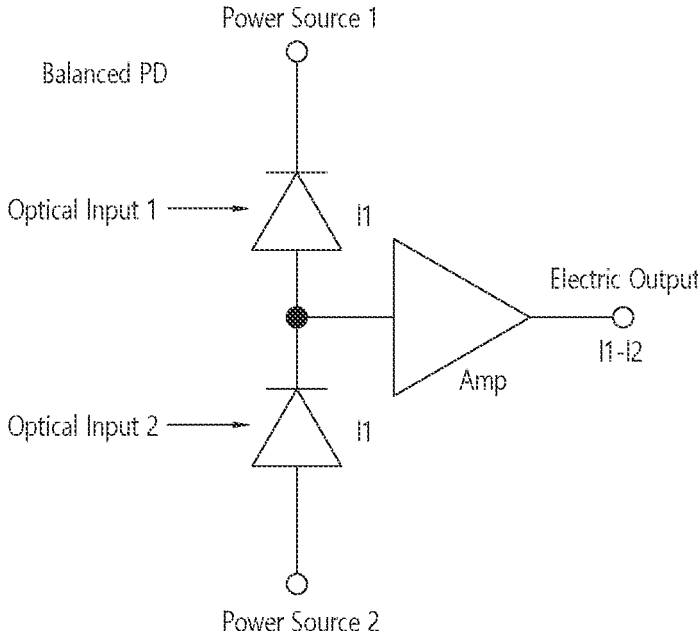

FIG. 28 shows an example of a 3 dB coupler and a balanced PD to which the second implementation of the present disclosure is applied.

Among the component devices that comprise the coherent detector, a 3 dB coupler is a device that takes two optical sources as input, mixes them, and then branches the sources in a 50:50 ratio, which may create a phase difference of the output source depending on the design of the 3 dB coupler. A balanced PD is a device that outputs only the current corresponding to the current difference of the optical signals input from each of the two PDs.

Referring to FIG. 28, the paths corresponding to polarization filters 0 and 1 acquire in-phase information and quadrature information by the coherent detector, while the paths corresponding to polarization filters 2 and 3 acquire only the magnitude information of the signal by the PDs. Therefore, the power measured at the detector in each path is measured in six magnitudes, $P_0^{(I)}$, $p_0^{(Q)}$, $P_1^{(I)}$, $p_1^{(Q)}$, $P_2$, and $P_3$, of which $P_0^{(I)}$, $P_0^{(Q)}$, $P_1^{(I)}$, and $P_1^{(Q)}$ are summed and fed into the ADC of the digital signal processor. Each of the measured magnitudes may be expressed by the characteristics of the polarizer passed through it as [Equation 31.

$$P_0^{(I)} = \left|E_x^{(I)}\right|^2$$ [Equation 31]

$$P_0^{(Q)} = \left|E_x^{(Q)}\right|^2$$

$$P_1^{(I)} = \left|E_y^{(I)}\right|^2$$

$$P_1^{(Q)} = \left|E_y^{(Q)}\right|^2$$

$$P_2 = \frac{1}{2}\left(E_x^2 + E_y^2 + 2E_x E_y \cos \delta\right)$$

$$P_3 = \frac{1}{2}\left(E_x^2 + E_y^2 + 2E_x E_y \sin \delta\right)$$

Thus, from the output power of Equation 31, the Stokes parameter may be obtained as shown in Equation 32.

$$S_0 = P_0^{(I)} + P_0^{(Q)} + P_1^{(I)} + P_1^{(Q)}$$ [Equation 32]

$$S_1 = P_0^{(I)} + P_0^{(Q)} - P_1^{(I)} - P_1^{(Q)}$$

$$S_2 = 2P_2 - \left(P_0^{(I)} + P_0^{(Q)} - P_1^{(I)} - P_1^{(Q)}\right)$$

-continued
$$S_3 = 2P_3 - \left(P_0^{(I)} + P_0^{(Q)} - P_1^{(I)} - P_1^{(Q)}\right)$$

From the obtained Stokes parameter, the polarization state may be obtained.

The components for the complex signal transmitted by the inhomogeneous polarization beam are divided into an in-phase signal and a quadrature signal, but are common for the x-axis component and they-axis component that constitute the polarization, and may be expressed as $|s_i^{(I)}|^2 = E_s^{(I)} E_s^{(I)}*$, or $|s_i^{(Q)}|^2 = E_s^{(Q)} E_s^{(Q)}*$ where $E_s^{(I)}$ and $E_s^{(Q)}$ are the received signals converted to amplitude signals by the PD and TIA. Since the signal is evenly divided at the coupler. $E_x^{(I)}$, $E_x^{(Q)}$ and $E_y^{(I)}$, $E_y^{(Q)}$ to reconstruct $E_s^{(I)}$ and $E_s^{(Q)}$, respectively, are equal to $\frac{1}{2}$ in terms of power, which may be expressed as $|s_i|^2 = 2|E_x|^2 + 2|E_y|^2$. Thus, with the above output power, the power $|s_i^{(C)}|^2 = 2(P_0^{(I)} + P_1^{(I)} + 2j(P_0^{(Q)} + P_1^{(Q)})$ of the complex signal may be obtained.

d) Digital Signal Processor

Referring again to FIG. 22, the digital signal processor comprises an Analog-to-Digital Converter (ADC) that converts the electrical analog signal converted at the optical detector to a digital signal, a demodulator that demodulates the digital signal, and a decoder that performs decoding on the demodulated signal. The digital signal processor decrypts the signal sent by the transmitter to acquire data.

The ADC converts the electrical analog signal converted at the optical detector into a digital signal. The ADC may convert an analog signal to a digital signal through electrical filters and down-sampling. The ADC may perform the conversion for both the X-polarization signal and the Y-polarization signal. For the coherent transmission and detection scheme that perform IQ modulation on each polarization signal, the ADC may separate each polarization signal into an in-phase signal and a quadrature signal and perform a separate conversion for each. The converted digital signals are fed into the demodulator.

The demodulator demodulates the digital signal converted at the ADC to obtain the matched coded bits. The demodulator is configured according to the modulation scheme used in the modulator, which may vary between IM/DD and phase-based modulation schemes. For each scheme, the demodulator configuration may also vary between single-carrier and multiple-carrier schemes.

The decoder obtains digital data by decoding the coded bit stream received from the transmitter. The configuration of the decoder may vary depending on the channel coding scheme used in the transmitter's encoder.

The present disclosure can have various advantageous effects.

For example, physical resources for beam search can be reduced.

For example, a transmitter can transmit an intensity signal and/or a demodulation signal via an inhomogeneous polarization beam, and a receiver can simultaneously acquire information about the signal and information about the polarization by the inhomogeneous polarization beam.

For example, it can be used in combination with a beam search procedure based on signal strength.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a transmitting end in a wireless communication system, the method comprising:
    transmitting a plurality of reference signals via each of plurality of beams to a receiving end;
    receiving, from the receiving end, feedback information comprising signal strength information and polarization information measured for each of the plurality of reference signals;
    selecting at least one beam from among the plurality of beams based on the signal strength information and the polarization information, the at least one beam corresponding to at least one inhomogeneous polarization beam pattern from among a plurality of inhomogeneous polarization beam patterns; and
    communicating with the receiving end based on the selected at least one beam.

2. The method of claim 1 wherein each of the plurality of beams has a same inhomogeneous polarization beam pattern.

3. The method of claim 1, wherein each of the plurality of beams has a different inhomogeneous polarization beam pattern.

4. The method of claim 3, wherein the different inhomogeneous beam polarization patterns overlap or do not overlap in space.

5. The method of claim 1, wherein selecting the at least one beam comprises:
    selecting at least one reference signal from among the plurality of reference signals based on the signal intensity information;
    selecting a beam index matrix associated with an index of the selected at least one reference signal; and
    selecting an index of the at least one beam based on the polarization information within the selected beam index matrix.

6. The method of claim 5, wherein selecting the beam index matrix comprises selecting a high resolution polarization pattern matrix associated with the index of the selected at least one reference signal.

7. The method of claim 1, wherein the transmitting end comprises an inhomogeneous polarization beam generator coupled with an intensity modulator.

8. The method of claim 7, wherein the plurality of reference signals having an intensity signal is transmitted via an inhomogeneous polarization beam pattern corresponding to each of the plurality of beams, by the inhomogeneous polarization beam generator coupled with the intensity modulator.

9. The method of claim 1, wherein the transmitting end comprises an inhomogeneous polarization beam generator coupled with an In-phase/Quadrature (IQ) modulator.

10. The method of claim 9, wherein the plurality of reference signals having a complex signal is transmitted via an inhomogeneous polarization beam pattern corresponding to each of the plurality of beams, by the inhomogeneous polarization beam generator coupled with the IQ modulator.

11. A method performed by a receiving end in a wireless communication system, the method comprising:
    receiving a plurality of reference signals via each of a plurality of beams from a transmitting end;
    measuring a signal strength and a polarization for the plurality of reference signals;
    selecting, based on the measured signal strength and the polarization, at least one beam, from among the plurality of beams, corresponding to at least one inhomogeneous polarization beam pattern from among a plurality of inhomogeneous polarization beam patterns; and
    communicating with the transmitting end based on the selected at least one beam.

12. The method of claim 11, wherein selecting the at least one beam comprises:
    selecting at least one reference signal from among the plurality of reference signals based on the measured signal strength;
    selecting a beam index matrix associated with an index of the selected at least one reference signal; and
    selecting an index of the at least one beam based on the measured polarization within the selected beam index matrix.

13. The method of claim 11, wherein the receiving end comprises at least one polarization filter and at least one photo detector, and
    wherein information about the polarization is measured based on a power output by a signal modulated with intensity passing through the at least one polarization filter and the at least one photo detector.

14. The method of claim 11, wherein the receiving end comprises at least one polarization filter and at least one coherent detector, and
    wherein information about the polarization is measured based on the power output by an in-phase and quadrature modulated complex signal passing through the at least one polarization filter and the at least one coherent detector.

15. The method of claim 14, wherein the at least one coherent detector comprises a 3 dB coupler and a balanced photodetector.

* * * * *